United States Patent
Kamei

(10) Patent No.: US 8,116,571 B2
(45) Date of Patent: Feb. 14, 2012

(54) PATTERN FEATURE EXTRACTION VIA FOURIER AMPLITUDES OF A BLOCK IMAGE

(75) Inventor: Toshio Kamei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/133,084

(22) Filed: Jun. 4, 2008

(65) Prior Publication Data

US 2008/0304750 A1 Dec. 11, 2008

Related U.S. Application Data

(62) Division of application No. 10/512,194, filed as application No. PCT/JP03/08556 on Jul. 4, 2003.

(30) Foreign Application Priority Data

| Jul. 16, 2002 | (JP) | 2002-207022 |
| Oct. 15, 2002 | (JP) | 2002-300594 |
| Mar. 13, 2003 | (JP) | 2003-068916 |

(51) Int. Cl.
*G06K 9/46* (2006.01)
(52) U.S. Cl. ........ 382/190; 382/280
(58) Field of Classification Search ........ 382/190, 382/208, 280, 254, 308, 276, 100, 115, 118
See application file for complete search history.

(56) References Cited

U.S. PATENT DOCUMENTS

| 5,684,890 A * | 11/1997 | Miyashita et al. ....... 382/154 |
| 5,937,082 A * | 8/1999 | Funada ....... 382/125 |
| 6,477,276 B1 * | 11/2002 | Inoue et al. ....... 382/232 |
| 6,647,157 B1 * | 11/2003 | Shiiyama et al. ....... 382/305 |
| 7,436,985 B2 | 10/2008 | Kittler |
| 2002/0009208 A1 * | 1/2002 | Alattar et al. ....... 382/100 |
| 2005/0201595 A1 | 9/2005 | Kamei |
| 2008/0304750 A1 | 12/2008 | Kamei |

FOREIGN PATENT DOCUMENTS

| JP | 07-296169 | 11/1995 |
| JP | 9-153135 | 6/1997 |
| JP | 2000-222572 | 8/2000 |
| JP | 2003-534613 | 11/2003 |
| JP | 4292837 | 4/2009 |
| WO | 95/20296 | 7/1995 |
| WO | WO 97/05566 | 2/1997 |

OTHER PUBLICATIONS

Moghaddam et al., "Probabilistic Visual Leaning for Object Detection", IEEE Transactions on Pattern Analysis and Machine Intelligence, vol. 17, No. 7, pp. 696-710, 1997.

(Continued)

*Primary Examiner* — Brian Q Le
*Assistant Examiner* — Edward Park
(74) *Attorney, Agent, or Firm* — Young & Thompson

(57) ABSTRACT

An input pattern feature amount is decomposed into element vectors. For each of the feature vectors, a discriminant matrix obtained by discriminant analysis is prepared in advance. Each of the feature vectors is projected into a discriminant space defined by the discriminant matrix and the dimensions are compressed. According to the feature vector obtained, projection is performed again by the discriminant matrix to calculate the feature vector, thereby suppressing reduction of the feature amount effective for the discrimination and performing effective feature extraction.

1 Claim, 20 Drawing Sheets

OTHER PUBLICATIONS

Zhao et al., "Discriminant Analysis of Principal Components for Face Recognition", Proceedings of the IEEE Third International Conference on Automatic Face and Gesture Recognition, pp. 336-341, 1998.

Liu et al., "Kernel-based Optimized Feature Vectors Selection and Discriminant Analysis for Face Recognition", Proceedings of IAPR International Conference on Pattern Recognition (ICPR), vol. II, pp. 362-365, 2002.

Baudat, "Generalized Discriminant Analysis Using a Kernel Approach", Neural Computation, vol. 12, pp. 2385-2404, 2000.

Duda et al., "Pattern Recognition", supervised/translated by Morio Onoue, Shingijutu Communications, 2001, pp. 113-122.

Ishii et al., "Intelligible Pattern Recognition", Ohmsha, 1998.

Swets et al., "Using Discriminant Eigenfeatures for Image Retrieval", IEEE Transactions on Pattern analysis and Machine Intelligence, vol. 18, No. 8, Aug. 1996, pp. 831-836. XP 000632863.

Chellappa et al., "Human and Machine Recognition of Faces: A Survey", Proceedings of the IEEE, vol. 83, No. 5, 1995, pp. 705-740, XP000517100.

European Patent Office issued an European Search Report dated Feb. 12, 2010, Application No. 03 741 208.7.

Japanese Official Action—2009-013764—Feb. 22, 2011.

* cited by examiner

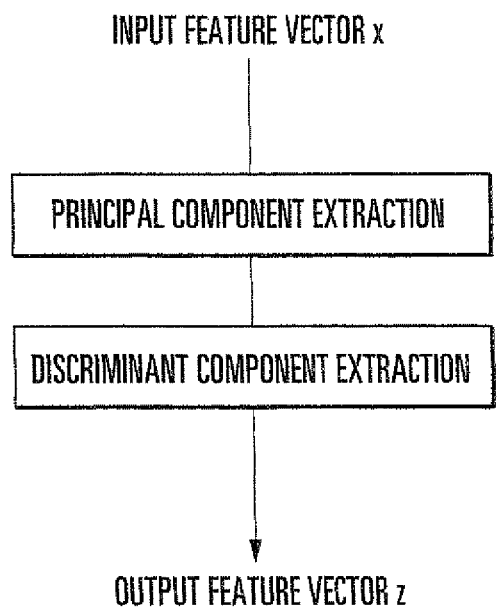
FIG. 2
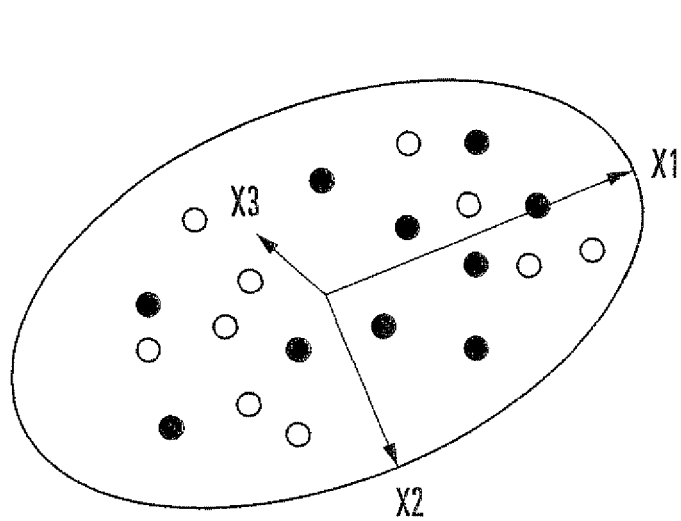 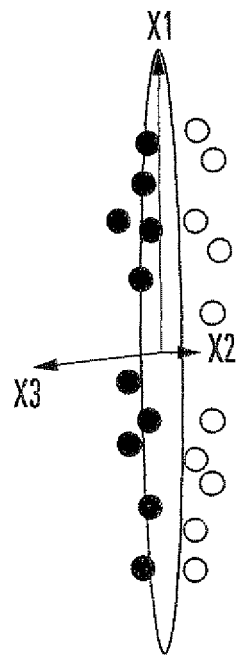
FIG.3A   FIG.3B

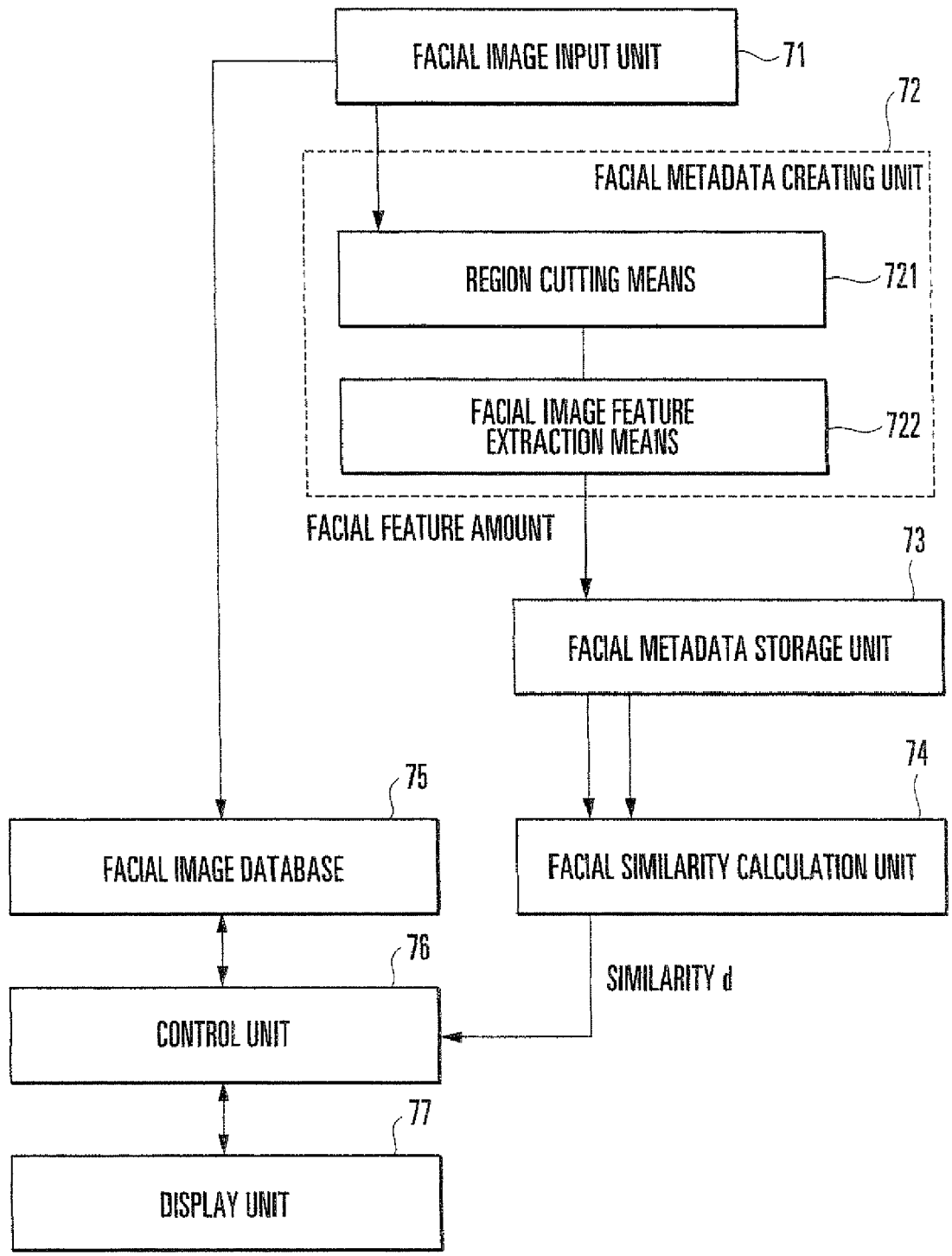
F I G. 7

FIG. 15

```
<complexType name="AdvancedFaceRecognitionType" final="#all" >
  <extension base="mpeg7:VisualDType" >
    <complexContent>
      <sequence>
        <element name="FourierFeature" >
          <simpleType>
            <restriction>
              <simpleType>
                <list itemType="mpeg7:unsigned5" />
              </simpleType>
              <minlength value="24" />
              <maxlength value="63" />
            </restriction>
          </simpleType>
        </element>
        <element name="CentralFourierFeature" >
          <simpleType>
            <restriction>
              <simpleType>
                <list itemType="mpeg7:unsigned5" />
              </simpleType>
              <minlength value="24" />
              <maxlength value="63" />
            </restriction>
          </simpleType>
        </element>
      </sequence>
    </complexContent>
  </extension>
</complexType>
```

FIG. 16

| | Number of bits | Mnemonic |
|---|---|---|
| AdvancedFaceRecognition{ | | |
| numOfFourierFeature | 6 | uimsbf |
| numOfCentralFourierFeature | 6 | uimsbf |
| for(k=0; k<numOfFourierFeature; k++){ | | |
| FourierFeature[k] | 5 | uimsbf |
| } | | |
| for(k=0; k<numOfCentralFourierFeature; k++){ | | |
| CentralFourierFeature[k] | 5 | uimsbf |
| } | | |
| } | | |

F I G. 19

| FEATURE VECTOR | FEATURE VECTOR ELEMENT | REGION A | | REGION B | | NUMBER OF DIMENSIONS OF VECTOR | | |
|---|---|---|---|---|---|---|---|---|
| | | $S_A$ | $E_A$ | $S_B$ | $E_B$ | SUBTOTAL | NUMBER OF BLOCKS | SUM TOTAL |
| FOURIER SPECTRUM VECTOR $x_1^f$ | $Re[F(\mu,\nu)]$ | (0,0) | (11,13) | (35,0) | (45,13) | 322 | - | 644 |
| | $Im[F(\mu,\nu)]$ | (0,0) | (11,13) | (35,0) | (45,13) | 322 | - | |
| MULTIBLOCK FOURIER AMPLITUDE VECTOR $x_2^f$ | $|F_1^0(\mu,\nu)|$ | (0,0) | (10,13) | (33,0) | (43,13) | 308 | 1 | 856 |
| | $|F_1^1(\mu,\nu)|$ | (0,0) | (5,6) | (17,0) | (21,6) | 77 | 4 | |
| | $|F_1^2(\mu,\nu)|$ | (0,0) | (2,2) | (9,0) | (10,2) | 15 | 16 | |

FIG. 20

| FEATURE VECTOR | FEATURE VECTOR ELEMENT | REGION A | | REGION B | | NUMBER OF DIMENSIONS OF VECTOR | | |
|---|---|---|---|---|---|---|---|---|
| | | $S_A$ | $E_A$ | $S_B$ | $E_B$ | SUBTOTAL | NUMBER OF BLOCKS | SUM TOTAL |
| FOURIER SPECTRUM VECTOR $x_1^B$ | $Re[G(\mu,\nu)]$ | (0,0) | (7,7) | (24,0) | (31,7) | 128 | - | 256 |
| | $Im[G(\mu,\nu)]$ | (0,0) | (7,7) | (24,0) | (31,7) | 128 | - | |
| MULTIBLOCK FOURIER AMPLITUDE VECTOR $x_2^B$ | $|G_1^0(\mu,\nu)|$ | (0,0) | (7,7) | (24,0) | (31,7) | 128 | 1 | 384 |
| | $|G_1^1(\mu,\nu)|$ | (0,0) | (3,3) | (12,0) | (15,3) | 32 | 4 | |
| | $|G_1^2(\mu,\nu)|$ | (0,0) | (1,1) | (6,0) | (7,1) | 8 | 16 | |

PATTERN FEATURE EXTRACTION VIA FOURIER AMPLITUDES OF A BLOCK IMAGE

BACKGROUND OF THE INVENTION

Conventionally, in the field of pattern recognition, the similarity between patterns such as characters or human faces has been determined by extracting feature vectors from input patterns, extracting feature vectors effective for identification from the feature vectors, and comparing the feature vectors obtained from the respective patterns.

In the case of face verification, for example, pixel values of a facial image normalized with the positions of the eyes or the like are raster-scanned to transform the pixel values into a one-dimensional feature vector, and the principal component analysis is performed by using this feature vector as an input feature vector (non-patent reference 1: Moghaddam et al., "Probabilistic Visual Learning for Object Detection", IEEE Transactions on Pattern Analysis and Machine Intelligence, Vol. 17, No. 7, pp. 696-710, 1997) or linear discriminant analysis is performed on the principal components of the feature vector (non-patent reference 2: W. Zhao et al., "Discriminant Analysis of Principal Components for Face Recognition", Proceedings of the IEEE Third International Conference on Automatic Face and Gesture Recognition, pp. 336-341, 1998), thereby reducing dimensions and performing personal identification or the like based on faces by using obtained feature vectors.

In these methods, covariance matrices, within-class covariance matrices, and between-class covariance matrices are calculated with respect to prepared learning samples, and basis vectors are obtained as solutions to the eigenvalue problems in the covariance matrices. The features of input feature vectors are then transformed by using these basis vectors.

Linear discriminant analysis will be described in more detail below.

Linear discriminant analysis is a method of obtaining a transformation matrix W which maximizes the ratio of a between-class covariance matrix $S_B$ to a within-class covariance matrix $S_W$ of an M-dimensional vector y $(=W^T x)$ obtained when an N-dimensional feature vector x is transformed by the transformation matrix W. As such a covariance evaluation function, equation (1) as an evaluation expression is defined:

$$J(W) = \frac{|S_B|}{|S_W|} = \frac{\left|W^T \sum_B W\right|}{\left|W^T \sum_W W\right|} \quad (1)$$

In this equation, the within-class covariance matrix $\Sigma_W$ and between-class covariance matrix $\Sigma_B$ are respectively a covariance matrix $\Sigma_i$ within C classes $\omega_i$ (i=1, 2, ..., C; their data count ni) in a set of feature vectors x in a learning sample and a covariance matrix between the classes, and are respectively represented by:

$$\sum_W = \sum_{i=1}^{C} P(\omega_i) \sum_i \quad (2)$$

$$= \sum_{i=1}^{C} \left( P(\omega_i) \frac{1}{n_i} \sum_{x \in x_i} (x - m_i)(x - m_i)^T \right)$$

$$\sum_B = \sum_{i=1}^{C} P(\omega_i)(m_i - m)(m_i - m)^T \quad (3)$$

where $m_i$ is a mean vector of a class $\omega_i$ (equation (4)), and m is a mean vector of x in total (equation (5)):

$$m_i = \frac{1}{n_i} \sum_{x \in x_j} x \quad (4)$$

$$m = \sum_{i=1}^{C} P(\omega_i) m_i \quad (5)$$

If a priori probability $P(\omega_i)$ of each class $\omega_i$ reflects a sample count $n_i$ in advance, it suffices to assume $P(\omega_i)=n_i/n$. If each probability can be assumed to be equal, it suffice to set $P(\omega_i)=1/C$.

The transformation matrix W which maximizes equation (1) can be obtained as a set of generalized eigenvectors corresponding to M large eigenvalues of equation (6) as the eigenvalue problem of a column vector $w_i$. The transformation matrix W obtained in this manner will be referred to as a discriminant matrix.

$$\sum_B w_i = \lambda_i \sum_W w_i \quad (6)$$

Note that a conventional linear discriminant analysis method is disclosed in, for example, non-patent reference 5: Richard O. Duda et al., "Pattern Recognition" (supervised/translated by Morio Onoue, Shingijutu Communications, 2001, pp. 113-122).

Assume that the number of dimensions of the input feature vector x is especially large. In this case, if small learning data is used, $\Sigma_W$ becomes singular. As a consequence, the eigenvalue problem of equation (6) cannot be solved by a general method.

As described in patent reference 1: Japanese Patent Laid-Open No. 7-296169, it is known that a high-order component with a small eigenvalue in a covariance matrix includes a large parameter estimation error, which adversely affects recognition precision.

According to the above article by W. Zhao et al., the principal component analysis is performed on input feature vectors, and discriminant analysis is applied to principal components with large eigenvalues. More specifically, as shown in FIG. 2, after principal components are extracted by projecting an input feature vector by using a basis matrix obtained by the principal component analysis, a feature vector effective for identification is extracted by projecting principal components by using the discriminant matrix obtained by discriminant analysis as a basis matrix.

According to the computation scheme for feature transformation matrices described in patent reference 1: Japanese Patent Laid-Open No. 7-296169, the number of dimensions is reduced by deleting high-order eigenvalues of total covariance matrix $\Sigma_T$ and corresponding eigenvectors, and discriminant analysis is applied to a reduced feature space. Deleting high-order eigenvalues of total covariance matrix and corresponding eigenvectors is equivalent to performing discriminant analysis in a space of only principal components with large eigenvalues by the principal component analysis. In this sense, this technique, like the method by W. Zhao, provides stable parameter estimation by removing high-order features.

The principal component analysis using the total covariance matrix $\Sigma_T$, however, is no more than sequentially selecting orthogonal axes within a feature space in the axial direction in which large covariances appear. For this reason, a feature axis effective for pattern identification is lost.

Assume that the feature vector x is comprised of three elements ($x=(x_1, x_2, x_3)^T$) $x_1$ and $x_2$ are features which have large variances but are irrelevant to pattern identification, and $x_3$ is effective for pattern identification but has a small variance (between-class variance/within-class variance, i.e., Fisher's ratio, is large, but the variance value itself is sufficiently smaller than those of $x_1$ and $x_2$). In this case, if the principal component analysis is performed and only two-dimensional values are selected, a feature space associated with $x_1$ and $x_2$ is selected, and the contribution of $x_3$ effective for identification is neglected.

This phenomenon will be described with reference to the accompanying drawings. Assume that FIG. 3A is the distribution of data viewed from a direction almost perpendicular to the plane defined by $x_1$ and $x_2$/with the black circles and white circles representing data points in different classes. When viewed in the space defined by $x_1$ and $x_2$ (plane in FIG. 3A), black and white circles cannot be identified. When, however, viewed from a feature axis of $x_3$ perpendicular to this plane as shown in FIG. 3B, black and white circles can be separated from each other. If, however, an axis with a large variance is selected, the plane defined by $x_1$ and $x_2$ is selected as a feature space, which is equivalent to performing discrimination by seeing FIG. 3A. This makes it difficult to perform discrimination.

In the prior art, this is a phenomenon which cannot be avoided by the principal component analysis and the technique of deleting spaces with small eigenvalues in (total) covariance matrices.

DISCLOSURE OF INVENTION

The present invention has been made in consideration of the above problems in the prior art, and has as its object to provide a feature vector transformation technique for suppressing a reduction in feature amount effective for discrimination and performing efficient feature extraction when a feature vector effective for discrimination is to be extracted from an input pattern feature vector and feature dimensions are to be compressed.

A pattern feature extraction method according the present invention is characterized by comprising the step of expressing one of a pattern feature and a feature from an image by using a plurality of feature vectors $x_i$, the step of obtaining a discriminant matrix $W_i$ of each feature vector by linear discriminant analysis with respect to each of the plurality of feature vectors $x_i$, the step of obtaining in advance a discriminant matrix $W_T$ by linear discriminant analysis with respect to a feature vector y obtained by arraying vectors $y_i$ obtained by linearly transforming the vectors $x_i$ using the discriminant matrix $W_i$, and the step of performing linear transformation specified by the discriminant matrix $W_i$ and the discriminant matrix $W_T$.

This pattern feature extraction method is characterized in that the step of performing linear transformation comprises the step of compressing the number of feature dimensions by transforming a feature vector of a pattern.

In addition, the method is characterized in that the step of expressing comprises the step of dividing a pattern feature into a plurality of feature vectors $x_i$, the step of obtaining the discriminant matrix $W_T$ comprises the step of calculating a feature vector $y_i$ by performing linear transformation $y_i=W_i^T x_i$ with respect to the feature vector $x_i$ using the discriminant matrix $W_i$, and the step of performing linear transformation comprises the step of compressing the number of dimensions of a pattern feature by calculating a feature vector z by calculating linear transformation $z=W_T^T y$ with respect to a vector y obtained by combining calculated feature vector $y_i$ using the discriminant matrix $W_T$.

In addition, the method is characterized by further comprising the step of calculating in advance a matrix w specified by the discriminant matrices $W_i$ and $W_T$, wherein the step of performing linear transformation comprises the step of compressing the number of dimensions of a pattern feature by calculating a feature vector z by calculating linear transformation $z=W_{TX}$ with respect a feature vector x obtained by combining input feature vectors $x_i$ and the matrix W using the matrix W.

The above pattern feature extraction method is characterized in that the step of expressing comprises the step of extracting a feature vector $x_i$ formed from pixel values obtained from a plurality of sample points with respect to a plurality of sample point sets $S_i$ preset in an image, and the step of performing linear transformation comprises the step of extracting a feature amount from the image by transforming a feature vector for each image sample set.

This pattern feature extraction method is characterized in that the step of obtaining in advance the discriminant matrix $W_T$ comprises the step of calculating a feature vector $y_i$ by performing linear transformation $y_i=W_i^T x_i$ with respect to a plurality of feature vectors $x_i$ formed from a plurality of sample points by using the discriminant matrix $W_i$, and the step of performing linear transformation comprises the step of extracting a feature amount from an image by calculating a feature vector z by calculating linear transformation $z=W_T^T y$ with respect to a vector y obtained by combining calculated feature vectors $y_i$ by using the discriminant matrix $W_T$.

The method is characterized by further comprising the step of calculating in advance a matrix W specified by the discriminant matrices $W_i$ and $W_T$, wherein the step of performing the linear transformation comprises the step of extracting a feature amount from an image by calculating a feature vector z by calculating linear transformation $z=W_{TX}$ of a vector x obtained by combining feature vectors $x_i$ and the matrix W by using the matrix W.

The above pattern feature extraction method is characterized in that the step of expressing comprises the step of segmenting an image into a plurality of preset local regions, and expressing a feature amount as a feature vector $x_i$ extracted for each of the plurality of local regions, and the step of performing linear transformation comprises the step of extracting a feature amount from an image by transforming a feature vector of a local region.

This pattern feature extraction method is characterized in that the step of obtaining in advance the discriminant matrix $W_T$ comprises the step of calculating a feature vector $y_i$ by performing linear transformation $y_i=W_i^T x_i$ with respect to a feature vector $x_i$ by using the discriminant matrix $W_i$, and the step of performing linear transformation comprises the step of extracting a feature amount from an image by calculating a feature vector z by calculating linear transformation $z=W_T^T y$ with respect to a vector y obtained by combining calculated feature vector $y_i$ using the discriminant matrix $W_T$.

The method is characterized by further comprising the step of calculating in advance a matrix W specified by the discriminant matrices $W_i$ and $W_T$, wherein the step of performing linear transformation comprises the step of extracting a feature amount from an image by calculating a feature vector z by calculating linear transformation $z=W_{TX}$ with respect a feature vector x obtained by combining input feature vectors $x_i$ and the matrix W using the matrix W.

The above pattern feature extraction method is characterized by further comprising the step of performing a two-dimensional Fourier transform for an image, wherein the step of expressing comprises the step of extracting a real component and an imaginary component of a two-dimensional Fourier transform as a feature vector $x_i$, and the step of calculating a power spectrum of a two-dimensional Fourier transform, and extracting the power spectrum as a feature vector $x_2$, and in the step of performing linear transformation, a feature amount is extracted from an image by transforming a feature vector.

This pattern feature extraction method is characterized in that in the step of performing linear transformation, a feature amount is extracted from an image by transforming a feature vector $x_1$ corresponding to a real component and an imaginary component of a Fourier component and a feature vector $x_2$ corresponding to a power spectrum of the Fourier component by linear transformation specified by a discriminant matrix $W_i$ and a discriminant matrix $W_T$ corresponding to principal components of a feature vector $x_i$ in such a manner that dimension reduction is realized.

This pattern feature extraction method is characterized by further comprising the step of calculating a discriminant feature of principal components of a feature vector $x_1$ formed from a real component and an imaginary component based on a Fourier transform by linear transformation $y_1=\phi_1^T x_1$ using a transformation matrix $\psi_1$ for transforming the principal components of the feature vector $x_1$ and a basis matrix $\phi_1$ ($=(W_1^T \psi_1^T)^T$) represented by a discriminant matrix $W_1$ corresponding to the principal components, the step of normalizing a size of an obtained feature vector $y_1$ to a predetermined size, the step of calculating a discriminant feature of principal components of a feature vector $x_2$ formed from a power spectrum based on Fourier transformation by using a transformation matrix $\psi_2$ for transforming the feature vector $x_2$ to principal components and a basis matrix $\phi_2$ ($=(W_2^T \psi_2^T)^T$) represented by a discriminant matrix $W_2$ corresponding to the principal components, the step of normalizing a size of an obtained feature vector $y_2$ to a predetermined size, and the step of extracting a feature amount from an image by calculating a feature vector z by calculating linear transformation $z=W_T^T y$ using a discriminant matrix $W_T$ with respect to a feature vector y obtained by combining two feature vectors $y_1$ and $y_2$.

This pattern feature extraction method is characterized in that the step of expressing further comprises the step of segmenting an image into a plurality of regions, and in the step of extracting the feature vector $x_2$, a two-dimensional Fourier power spectrum is calculated in each of the segmented regions.

In addition, the method is characterized in that in the step of segmenting, a region is segmented into regions having different sizes in a multiple manner.

In addition, the method is characterized in by further comprising the step of reducing feature dimensions by performing feature extraction by kernel discriminant analysis on an obtained two-dimensional Fourier power spectrum and extracting an effective feature amount.

The method is characterized by further comprising the step of reducing feature dimensions by performing linear transformation using a discriminant matrix obtained in advance by linear discriminant analysis with respect to an obtained two-dimensional Fourier power spectrum.

The method is characterized in that the step of obtaining in advance the discriminant matrix $W_i$ comprises the step of obtaining the discriminant matrix $W_i$ of feature vectors obtained by linear discriminant analysis on principal components of a feature vector $x_i$ (i=1, 2), and in the step of performing linear transformation, a feature amount is extracted from an image by transforming a feature vector $x_1$ corresponding to a real component and an imaginary component of a Fourier component and a feature vector $x_2$ corresponding to a power spectrum of the Fourier component by linear transformation specified so as to reduce dimensions by a discriminant matrix $W_i$ and a discriminant matrix $W_T$ corresponding to principal components of the feature vector $x_i$.

This pattern feature extraction method is characterized in that the step of expressing further comprises the step of calculating a power spectrum of a two-dimensional Fourier transform, the step of segmenting an image into a plurality of regions and calculating a power spectrum of a two-dimensional Fourier transform for each of the regions, and the step of extracting a vector obtained combining the respective power spectra as a feature vector $x_2$.

A pattern feature extraction device according to the present invention is a pattern feature extraction device for compressing feature dimensions of a pattern feature by using linear transformation, characterized by comprising basis matrix storage means for storing a basis matrix specified by a discriminant matrix $W_i$ of feature vectors obtained by linear discriminant analysis on a plurality of feature vectors $x_i$ representing a pattern feature and a discriminant matrix $W_T$ obtained in advance by linear discriminant analysis on a feature vector y obtained by combining vectors $y_i$ obtained by performing linear transformation of the vectors $x_i$ using a discriminant matrix, and linear transformation means for compressing feature dimension by transforming a feature vector of a pattern by using the basis matrix stored by the basis matrix storage means.

A computer-readable storage medium according to the present invention is a computer-readable storage medium which records a program for causing a computer to execute pattern feature extraction to compress feature dimensions of a pattern feature by using linear transformation, the program being characterized by including a program for executing a function of expressing a pattern feature by a plurality of feature vectors $x_i$, obtaining in advance a discriminant matrix $W_i$ of feature vectors obtained by performing linear discriminant analysis on each of the feature vectors $x_i$, and obtaining in advance a discriminant matrix $W_T$ by linear discriminant analysis on a feature vector y obtained by combining vectors $y_i$ obtained by linear transformation of the vectors $x_i$, and a function of compressing feature dimensions by transforming a feature vector of a pattern by linear transformation specified by the discriminant matrix $W_i$ and the discriminant matrix $W_T$.

An image feature extraction method according to the present invention is characterized by comprising the step of obtaining a Fourier spectrum vector by calculating a Fourier spectrum of an input normalized image by using a predetermined mathematic expression, the step of extracting a multi-block Fourier amplitude vector from a Fourier amplitude of a partial image of the normalized image, the step of obtaining normalized vectors of a Fourier spectrum vector and the multiblock intensity vector by performing projection of feature vectors with respect to the Fourier spectrum vector and the multiblock intensity vector by using a basis matrix, the step of combining the normalized vectors to form a combined Fourier vector and obtaining a projection vector of the coupled value by using a second basis matrix, and the step of extracting a Fourier feature by quantizing the projection vector.

BRIEF DESCRIPTION OF DRAWINGS

FIG. 2 is a view for explaining the prior art;

FIG. 3 is a view for explaining the distribution of pattern features;

FIG. 7 is a block diagram showing the arrangement of a facial image matching system according to the third embodiment of the present invention;

FIG. 15 is a view showing an example of a facial description according to the fifth embodiment of the present invention;

FIG. 16 is a view showing an example of a rule when a binary representation syntax is used in the fifth embodiment of the present invention;

FIG. 19 is a table showing an example of a Fourier spectrum scanning rule in the fifth embodiment of the present invention;

FIG. 20 is a table showing an example of scanning regions in a Fourier space for CentralFourierFeature elements in the fifth embodiment of the present invention.

DETAILED DESCRIPTION OF EMBODIMENTS

First Embodiment

Figure 1:
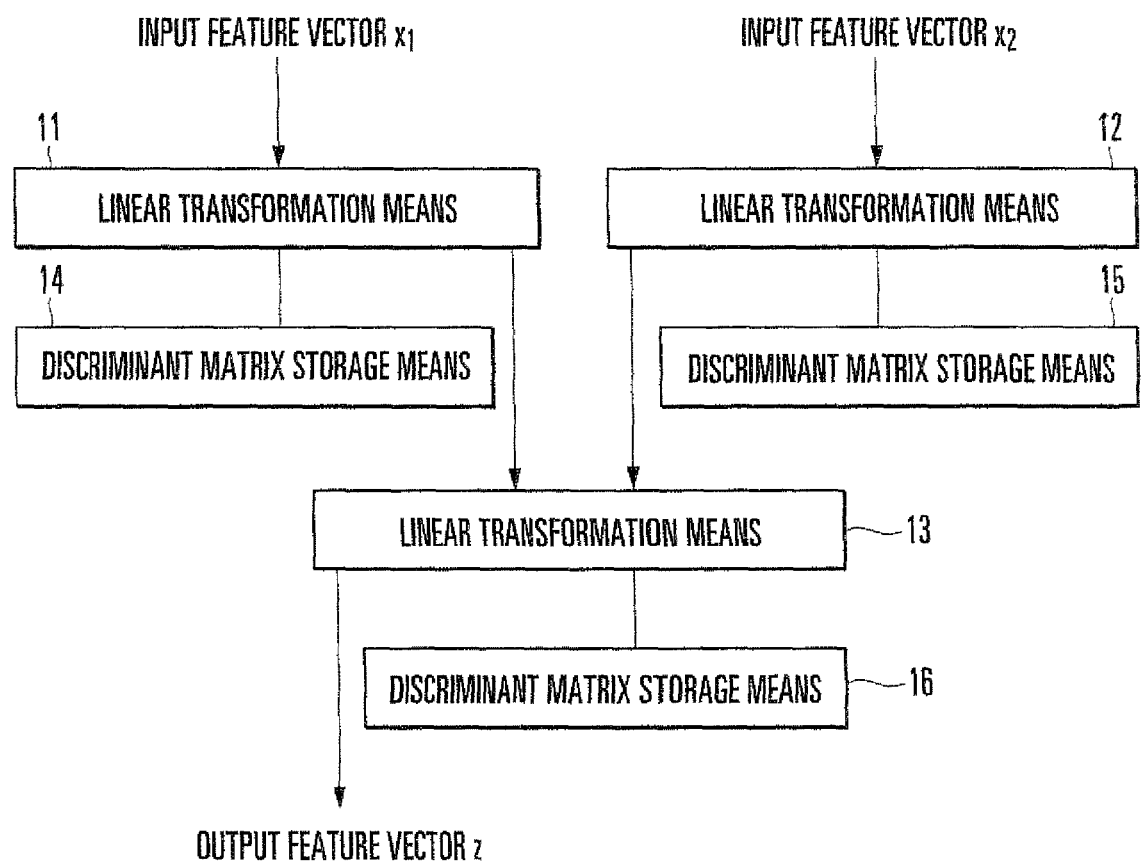
FIG. 1 is a block diagram showing the arrangement of a pattern feature extraction device according to an embodiment of the present invention.

An embodiment of the present invention will be described in detail with reference to the accompanying drawings. FIG. 1 is a block diagram showing a pattern feature extraction device using a pattern feature extraction device according to the present invention.

The pattern feature extraction device will be described in detail below.

As shown in FIG. 1, the pattern feature extraction device according to the present invention includes a first linear transformation means 11 for linearly transforming an input feature vector $x_1$, a second linear transformation means 12 for linearly transforming an input feature vector $x_2$, and a third linear transformation means 13 for receiving feature vectors which are transformed and dimension-reduced by the linear transformation means 11 and 12 and linearly transforming them. The respective linear transformation means perform basis transformation based on discriminant analysis by using discriminant matrices obtained in advance by learning and stored in discriminant matrix storage means 14, 15, and 16.

The input feature vectors $x_1$ and $x_2$ are feature amounts which are extracted in accordance with purposes in character recognition, face verification, and the like, and include, for example, directional features calculated from the gradient features of an image, and density features which are nothing less than the pixel values of an image. Each vector includes a plurality of elements. In this case, for example, $N_1$ directional features are input as one feature vector $x_1$, and other $N_2$ density values as the feature vector $x_2$.

The discriminant matrix storage means 14 and 15 store discriminant matrices $W_1$ and $W_2$ obtained by performing linear discriminant analysis on the feature vectors $x_1$ and $x_2$.

As described above, discriminant matrices may be obtained by calculating a within-class covariance matrix $\Sigma_W$ (equation (2)) and between-class covariance matrix $\Sigma_B$ (equation (3)) with respect to feature vectors in prepared learning samples in accordance with their classes, as described above. A priori probability $P(\omega_i)$ of each class $\omega_i$ may be given by $P(\omega_i)=n_i/n$ with sample count sample count $n_i$ being reflected.

Discriminant matrices can be obtained in advance by selecting eigenvectors $W_i$ corresponding to the large eigenvalues in an eigenvalue problem expressed by equation (6) with respect to these covariance matrices.

When $M_1$-dimensional and $M_2$-dimensional bases smaller than input feature dimensions $N_1$ and $N_2$ are selected with respect to the feature vectors $x_1$ and $x_2$, $M_1$-dimensional and $M_2$-dimensional feature vectors $y_1$ and $y_2$ can be obtained by projective transformation to discriminant bases, $$y_1 = W_1^T x_1$$

$$y_2 = W_2^T x_2 \qquad (7)$$

In this case, the sizes of the matrices $W_1$ and $W_2$ are $M_1 \times N_1$ and $M_2 \times N_2$, respectively.

The numbers of feature dimensions can be efficiently reduced by greatly reducing dimension counts $M_1$ and $M_2$ of feature spaces to be projected. This can effectively decrease the data amount and increase the processing speed. If, however, the number of feature dimensions is reduced too much, the discriminant performance deteriorates. This is because as the number of feature dimensions is reduced, feature amounts effective for discrimination are lost.

For this reason, the dimension counts $M_1$ and $M_2$ of feature vectors are amounts which are easily influenced by the number of learning samples, and are preferably determined on the basis of experiments.

The third linear transformation means 13 projects the vectors $y_1$ and $y_2$ calculated by the first and second linear transformation means as an input feature vector y to a discriminant space. A discriminant matrix W3 to be registered in the discriminant matrix storage means 16 is obtained from learning samples as in the case wherein the first and second discriminant matrices are calculated. The input feature vector y is a vector having elements arranged as expressed by equation (8) given below:

$$y = \begin{pmatrix} y_1 \\ y_2 \end{pmatrix} \qquad (8)$$

As in one case of equation (7), the Lth-dimensional feature vector y is projected according to equation (9) by using the basis matrix $W_3$ (the size of the matrix is $L \times (M_1+M_2)$), and a feature vector z to be output is obtained.

$$z = W_3^T y \qquad (9)$$

In this manner, each feature vector is divided, and linear discriminant analysis is performed on learning samples of feature vectors with small dimension counts, thereby suppressing estimation errors, which tend to occur in high-dimensional feature components, and obtaining features effective for discrimination.

In the above case, the three linear transformation means are provided to perform processing concurrently and stepwisely. However, since a linear discrimination means can be basically realized by a product-sum computing unit, one linear transformation means can be commonly used by switching discriminant matrices to be read out in accordance with the input feature vector to be linearly transformed.

The size of a necessary computing unit can be reduced by using one linear transformation means in this manner.

As is obvious from equations (7), (8), and (9), the computation of an output feature vector z can be expressed as:

$$\begin{aligned} Z &= W_3^T \begin{pmatrix} y_1 \\ y_2 \end{pmatrix} \\ &= W_3^T \begin{pmatrix} W_1^T x_1 \\ W_2^T x_2 \end{pmatrix} \\ &= W_3^T \begin{pmatrix} W_1^T & 0 \\ 0 & W_2^T \end{pmatrix} \begin{pmatrix} x_1 \\ x_2 \end{pmatrix} \\ &= W^T \begin{pmatrix} x_1 \\ x_2 \end{pmatrix} \end{aligned} \qquad (10)$$

That is, linear transformations using the respective discriminant matrices can be integrated into linear transformation using one matrix. In stepwise computation processing, the number of times of product-sum computation is $L \times (M_1+M_2)+M_1 N_1+M_2 N_2$. When matrices are integrated into one matrix, the number of times of product-sum computation is $L \times (N_1+N_2)$. If, for example, $N_1=N_2=500$, $M_1=M_2=200$, and $L=100$, 240,000 product-sum computations are required in stepwise computation processing. In the latter computation processing, 100,000 product-sum computations are required. The computation amount in batch computation processing as in the latter case is smaller than that in the former case, and hence high-speed computation can be realized. As is obvious from the mathematical expressions, when a final dimension count L is to be reduced, the batch computation method can reduce the computation amount and hence is effective.

Second Embodiment

According to the above case, when different kinds of features, e.g., directional features and density features, are to be joined together, discriminant analysis is repeatedly performed on a feature vector having undergone discriminant analysis for each feature. However, a plurality of elements corresponding to one feature may be divided into a plurality of vectors, discriminant analysis may be performed on each element set as an input feature, and the corresponding projected vector may be further subjected to discriminant analysis.

In the second embodiment, a facial image feature extraction device will be described.

Figure 4:
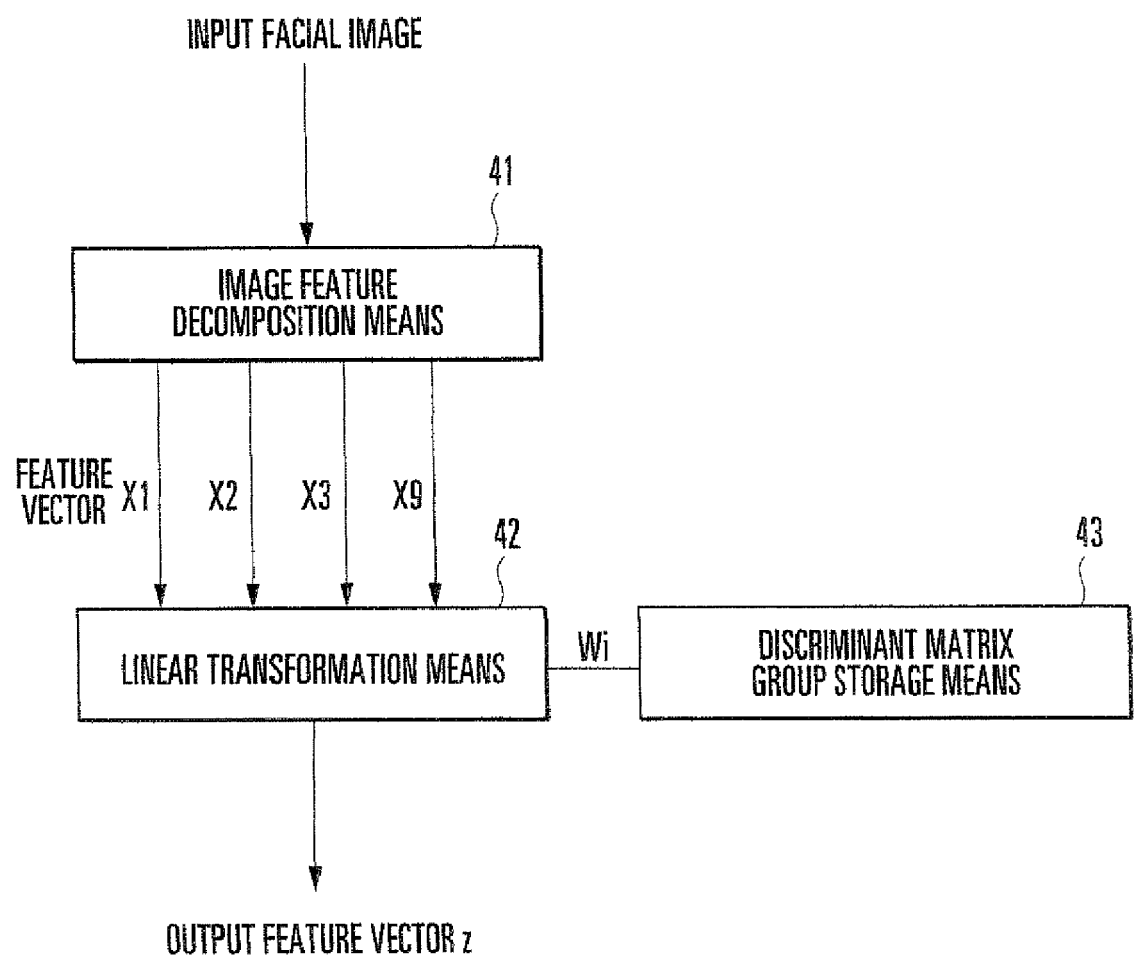
FIG. 4 is a block diagram showing the arrangement of a pattern feature extraction device according to the second embodiment of the present invention.

As shown in FIG. 4, the facial image feature extraction device according to the second invention includes an image feature decomposition means 41 for decomposing the density feature of an input facial image, a linear transformation means 42 for projecting a feature vector in accordance with a discriminant matrix corresponding to the feature vector, and a discriminant matrix group storage means 43 for storing the respective discriminant matrices described above.

Techniques of extracting features from facial images include a method of positioning facial images at the eye position or the like and setting their density values as vector features, as disclosed in the above article by W. Zhao et al.

In the second invention as well, pixel density values of an image are handled as an input feature, i.e., an original feature. However, an image feature has a large image size, for example, $42 \times 54$ pixels=2352 dimensions with the central positions of the left and right eyes being normalized to the coordinates (14, 23) and (29, 23). With such large feature dimensions, it is difficult to perform high-precision feature extraction by directly performing linear discriminant analysis using limited learning samples. Therefore, a deterioration in feature which is caused when the principal component analysis or the like is applied is suppressed by decomposing image feature elements, performing discriminant analysis on the decomposed features, and obtaining discriminant matrices.

Figure 5:
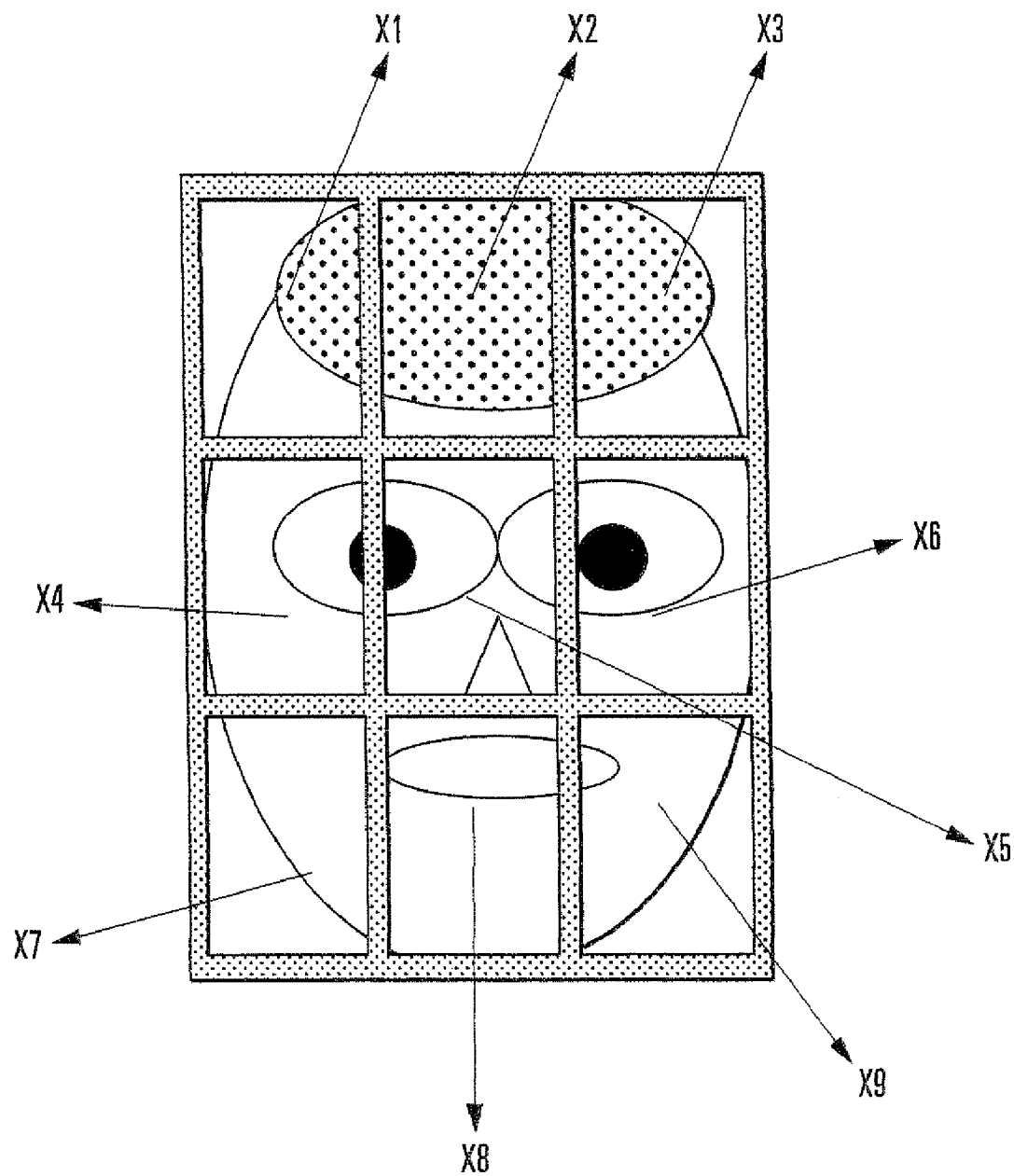
FIG. 5 is a view for explaining an embodiment of the present invention.

One of the methods of decomposing image features is to segment an image. For example, as shown in FIG. 5, an image is divided into nine parts each having a size of $14 \times 18$ pixels (=252 dimensions), local images having different sizes are set as feature vectors x: (i=1, 2, 3, . . . , 9), and discriminant analysis is performed on the respective partial images by using learning samples, thereby obtaining in advance discriminant matrices $W_i$ corresponding to the respective feature vectors.

Note that letting regions have overlaps when an image is segmented makes it possible to reflect, in feature vectors, feature amounts based on the correlations between pixels in the boundary regions. Therefore, the respective regions may be sampled after being overlapped.

Since the number of feature dimensions is greatly reduced to 252 as compared with the original image, a basis matrix based on discriminant analysis can be calculated with high precision by sampling several images of each of several hundred individuals, i.e., a total of several thousand facial images. If the number of feature dimensions is as large as that of the original feature (2352 dimensions), in order to obtain similar performance with features based on discriminant analysis, it is expected that facial images of several thousand individuals must be sampled. In practice, however, it is difficult to collect such a large amount of image data, and hence this technique cannot be realized.

Assume that the feature in each local region is compressed to a 20-dimensional feature by a first-stage discriminant feature. In this case, the resultant output feature vectors become a feature vector of 9 regions×20 dimensions=180 dimensions. By further performing discriminant analysis on this feature vector, the number of dimensions can be efficiently reduced to about 50 dimensions. This second-stage discriminant matrix is also stored in the discriminant matrix group storage means 43, and discriminant analysis is performed again by the linear transformation means 42 upon receiving the 180-dimensional vector of the first-stage discriminant feature. Note that the first-stage discriminant matrix and second-stage discriminant matrix may be calculated in advance as indicated by equation (10). However, when 252 dimensions×9 regions are to be compressed to 20 dimensions×9 regions, and the 180 dimensions are to be transformed into 50 dimensions, the calculation in two stages will reduce the memory to be used and the computation amount to ½ or less and hence is efficient.

By applying discriminant analysis locally and stepwisely, a facial feature with high identification performance can be extracted. Assume that in character recognition, for example, "大"and "大"are to be identified. In this case, if the principal component analysis is performed on each entire character image to extract components having large eigenvalues, the feature "" that helps to identify "大"and "大"tends to be lost (for this reason, similar character identification is sometimes performed by using a specific high-order feature instead of a feature of a portion with a large eigenvalue obtained by the principal component analysis). The effectiveness of segmenting an image into local regions and extracting discriminant features is similar to a phenomenon in similar character identification in character recognition. It can be thought that spatially limiting a feature that is easy to identify can ensure higher precision per unit dimension than performing discriminant analysis on principal components as a whole.

Figure 6:
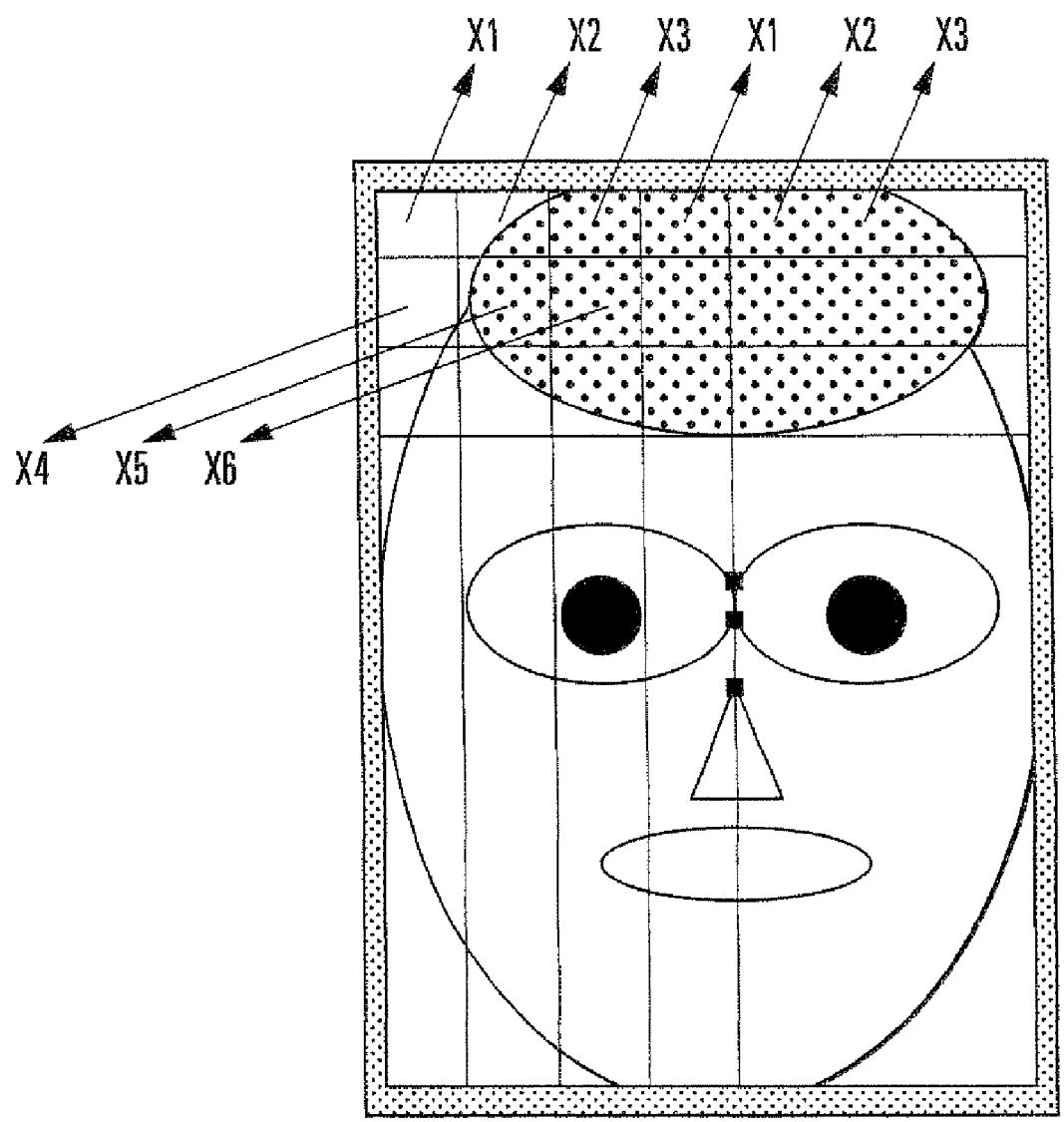
FIG. 6 is a view for explaining an embodiment of the present invention.

In addition, the image feature decomposition means 41 may sample images from an entire image and segment the sampled images instead of segmenting an image and forming a feature vector for each local region. When, for example, a primary feature is to be divided by nine into nine 252-dimensional vectors, sampling is performed from 3×3 regions, as shown in FIG. 6. That is, the sampled images become reduced images with slight positional differences. These reduced images are raster-scanned to be transformed into nine feature vectors. Such feature vectors are used as primary vectors to calculate discriminant components. These discriminant components may be integrated to perform discriminant analysis again.

Third Embodiment

Another embodiment of the present invention will be described in detail with reference to the accompanying drawings. FIG. 7 is a block diagram showing a facial image matching system using a facial metadata creating device according to the present invention.

The facial image matching system will be described in detail below.

As shown in FIG. 7, the facial image matching system according to the present invention includes a facial image input unit 71 which inputs facial images, a facial metadata creating unit 72 which creates facial metadata, a facial metadata storage unit 73 which stores extracted facial metadata, a facial similarity calculation unit 74 which calculates a facial similarity from facial metadata, a facial image database 75 which stores facial images, a control unit 76 which controls the input of images, the creation of metadata, the storage of metadata, and the calculation of facial similarities in accordance with an image registration request/retrieval request, and a display unit 77 of a display which displays facial images and other information.

The facial metadata creating unit 72 is comprised of a region cutting means 721 for cutting a facial region from an input facial image, and a facial image feature extraction means 722 which extracts a facial feature of the cut region. The facial metadata creating unit 72 creates metadata about a facial image by extracting facial feature vectors.

When a facial image is to be registered, a facial photo or the like is input upon adjustment of the size and position of the face by using the facial image input unit 71 such as a scanner or video camera. Alternatively, a human face may be directly input from a video camera or the like. In this case, it is preferable that the face position of the input image be detected by using a face detection technique like that disclosed in the above reference by Mohaddam and the size and the like of the facial image be automatically normalized.

The input facial image is registered in the facial image database 75 as needed. At the same time with facial image registration, the facial metadata creating unit 72 creates facial metadata and stores it in the facial metadata storage unit 73.

At the time of retrieval, the facial image input unit 71 inputs a facial image, and the facial metadata creating unit 72 creates facial metadata as in the case of registration. The created facial metadata is either registered in the facial metadata storage unit 73 or directly sent to the facial similarity calculation unit 74.

In retrieval operation, when it is to be checked whether or not data identical to a pre-input facial image exists in the database (facial identification), the similarity between the input facial image and each data registered in the facial metadata storage unit 73 is calculated. The control unit 76 selects a facial image from the facial image database 75 on the basis of the result exhibiting the highest similarity, and displays the facial image on the display unit 77 or the like. An operator then checks the coincidence between the faces in the retrieved image and the registered image.

When it is to be checked whether or not a facial image specified by an ID number or the like in advance coincides with a retrieved facial image (face verification), the facial similarity calculation unit 74 makes calculation to check whether or not the facial image specified by the ID number coincides with the retrieved image. If the calculated similarity is lower than a predetermined similarity, it is determined that the two images do not coincide with each other, and the result is displayed on the display unit 77. Assume that this system is used for room access management. In this case, room access management can be performed by causing the control unit 76 to send an opening/closing control signal to an automatic door so as to control the automatic door, instead of displaying a facial image.

The facial image matching system operates in the above manner. Such operation can be implemented on a computer system. For example, facial image matching can be realized by storing a metadata creation program for executing metadata creation to be described in detail next and a similarity calculation program in a memory and executing these programs using a program control processor.

In addition, these programs may be recorded on a computer-readable recording medium.

The operation of this facial image matching system, and more specifically, the operations of the facial metadata creating unit 72 and facial similarity calculation unit 74, will be described in detail next.

(1) Creation of Facial Metadata

The facial metadata creating unit 72 extracts a facial feature amount by using an image $I(x, y)$ whose position and size have been normalized. In normalizing the position and size, the image is preferably normalized to set the eye positions to (16, 24) and (31, 24) and the size to 46×56 pixels. In the following case, the image has been normalized to this size.

The region cutting means 721 then cuts a plurality of preset local regions of the facial image. In the case of the above image, for example, one region is the entire normalized facial image (f(x, y)) and the other is a central region g(x, y) of 32×32 pixels centered on the face. This region may be cut such that the positions of the two eyes are set to (9, 12) and (24, 12).

The reason why a central region of a face is cut in the above manner is that a stable feature can be extracted by cutting a range free from the influences of a hair style and the like even if the hair style changes (for example, when facial verification is used in a home robot, verification can be done even if the hair style changes before and after bathing). If a hair style and the like do not change (for example, personal identification within scenes in a video clip), since an improvement in verification performance can be expected by performing verification using images including hair styles, a large facial image including a hair style and a small facial image of a central portion of the face are cut.

The facial image feature extraction means 722 then performs two-dimensional discrete Fourier transforms for the two cut regions f(x, y) to extract a facial image feature.

Figure 8:
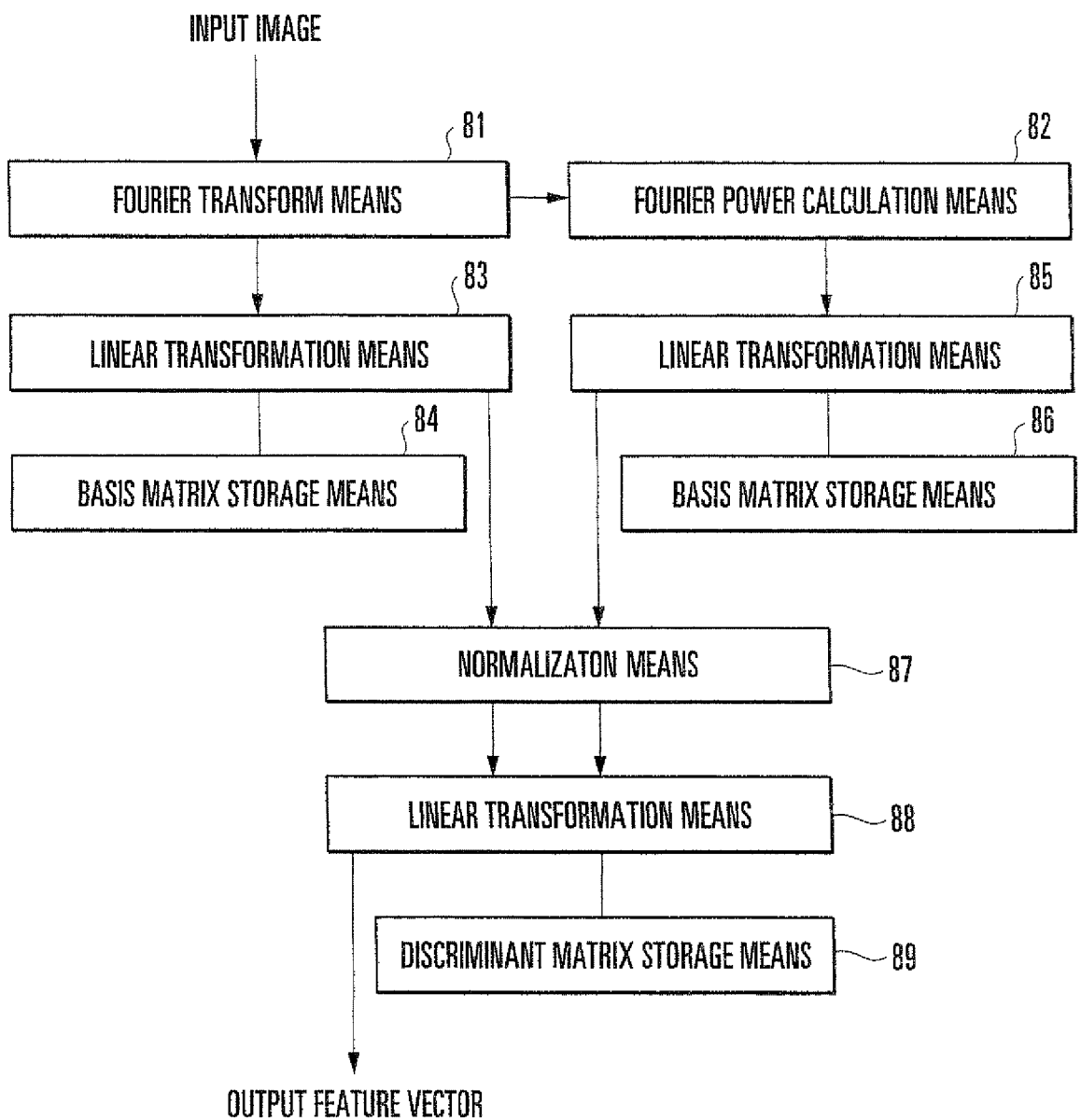
FIG. 8 is a view for explaining an embodiment of the present invention.

FIG. 8 shows the more detailed arrangement of the facial image feature extraction means 722. The facial image feature extraction means includes a Fourier transform means 81 for performing a discrete Fourier transform for a normalized cut image, a Fourier power calculation means 82 for calculating the power spectrum of a Fourier-transformed Fourier frequency component, a linear transformation means 83 for regarding a feature vector obtained by raster-scanning the real and imaginary components of the Fourier frequency component calculated by the Fourier transform means 81 as a one-dimensional feature vector and extracting a discriminant feature from the principal components of the feature vector, a basis matrix storage means 84 for storing a basis matrix for the transformation, a linear transformation means 85 for extracting a discriminant feature of principal components from a power spectrum in the same manner as described above, and a basis matrix storage means 86 for storing a basis matrix for the transformation. The facial image feature extraction means 722 further includes a linear transformation means 88 for normalizing each of the discriminant feature of the real and imaginary components of the Fourier feature and the discriminant feature of the power spectrum to a vector with a size of 1, and calculating a discriminant feature of a vector obtained by combining the two feature vectors, and a discriminant matrix storage means 89 for storing a discriminant matrix for the discriminant feature.

After a Fourier frequency feature is extracted with this arrangement, discriminant features of principal components are calculated for a feature vector including the real and imaginary parts of the Fourier frequency component as elements and a feature vector including a power spectrum as an element, and a discriminant feature is calculated again for a feature vector obtained by combining the above vectors, thereby calculating the feature amount of the face.

Each operation will be described in more detail below.

The Fourier transform means 81 performs a two-dimensional Fourier transform for the input image f(x, y) (x=0, 1, 2, ..., M−1, y=0, 1, 2, ..., N−1) to calculate a Fourier feature F(u, v) according to equation (11). This method is widely known and described in, for example, Rosenfeld et al., "Digital Picture Processing", Kindai Kagaku Sha, pp. 20-26, and hence a description thereof will be omitted.

$$F(u, v) = \sum_{x=0}^{M-1} \sum_{y=0}^{N-1} f(x, y) \exp\left(-2\Pi i\left(\frac{xu}{M} + \frac{yv}{N}\right)\right) \quad (11)$$

The Fourier power calculation means calculates a Fourier power spectrum |F(u, v)| by obtaining the size of the Fourier feature F(u, v) according to equation (12).

$$|F(u,v)| = \sqrt{|Re(F(u,v))|^2 + |Im(F(u,v))|^2} \quad (12)$$

The two-dimensional Fourier spectra F(u, v) and |F(u, v)| obtained in this manner are obtained by transforming only the images of two-dimensional real parts, the obtained Fourier frequency components become symmetrical. For this reason, these spectrum images F(u, v) and |F(u, v)| have M×N components (u=0, 1, ..., M−1; v=0, 1, ..., N−1), and half of the components, i.e., M×N/2 components (u=0, 1, ..., M−1; v=0, 1, ..., N−1) and the remaining half components are substantially equivalent. Therefore, the subsequent processing may be performed by using half components as a feature vector. Obviously, computation can be simplified by omitting computation for components which are not used as elements of a feature vector in the Fourier transform means 81 and Fourier power calculation means 82.

The linear transformation means 83 then handles the feature amount extracted as a frequency feature as a vector. A partial space to be defined in advance is set by a basis vector (eigenvector) obtained by preparing a facial image set for learning and performing discriminant analysis on the principal components of a frequency feature vector in a corresponding cut region. Since this basis vector is obtained by a widely known method described in various references including the reference by W. Zhao, a description thereof will be omitted. The reason why discriminant analysis is not directly performed is that the number of dimensions of a feature vector obtained by a Fourier transform is too large to directly handle discriminant analysis. Although the already indicated problem in principal component discriminant analysis remains unsolved, this technique is one choice as a technique of extracting a first-stage feature vector. Alternatively, a basis matrix obtained by the method of repeating discriminant analysis may be used.

That is, a discriminant matrix $\phi_1$ of principal components which is to be stored in the basis matrix storage means 84 can be obtained from learning samples in advance by performing discriminant analysis on the principal components of a one-dimensional feature vector $x_1$ obtained by raster-scanning the real and imaginary components of a frequency feature. In this case, a Fourier feature need not always be handled as a complex number, and may be handled as a real number with an imaginary component being handled as another feature element.

Letting $\psi_1$ be a basis matrix for principal components, and $W_1$ be a discriminant matrix obtained by discriminant analysis on the vector of the principal components, the discriminant matrix $\phi_1$ of the principal components can be expressed by $$\phi_1^T = W_1^T \psi_1^T \quad (13)$$

It suffices if the number of dimensions to be reduced by the principal component analysis is set to about 1/10 (about 200 dimensions) of the original feature Fourier feature. Thereafter, the number of dimensions is reduced to about 70 by this discriminant matrix. This basis matrix is calculated in advance from learning samples and is used as information to be stored in the basis matrix storage means 84.

In the case of the Fourier spectrum $|F(u, v)|$ as well, a spectrum is expressed as a one-dimensional feature vector $x_2$ by raster scanning, and basis matrix $\phi_2^T = \psi_2^T W_2^T$, which is obtained by discriminant analysis on the principal components of the feature vector, is obtained in advance by learning samples.

Calculating a principal component discriminant feature for each component of a Fourier feature in this manner makes it possible to obtain a discriminant feature $y_1$ of the principal components of the feature vector $x_1$ of the real and imaginary components of Fourier components, and a discriminant feature $y_2$ of the principal components of the feature vector $x_2$ of a power spectrum.

A normalization means 87 normalizes the size of each obtained feature vector to a unit vector with a size of 1. In this case, the vector length varies depending on the position of an origin for the measurement of a vector, and hence its reference position must also be determined in advance. In this case, it suffices if a reference point is set by using a mean vector $m_i$ obtained from a learning sample of a projected feature vector $y_i$. By setting a mean vector as a reference point, feature vectors are distributed around the reference point. In the case of a Gaussian distribution, in particular, feature vectors are isotropically distributed. This makes it easy to limit a distribution region in a case wherein a feature vector is quantized in the end.

That is, a vector $y_i^0$ obtained by normalizing the feature vector $y_i$ to a unit vector by using the mean vector $m_i$ can be expressed by $$y_i^0 = \frac{y_i - m_i}{|y_i - m_i|} \quad (14)$$

In this manner, the normalization means is provided to normalize the feature vector $y_1$ associated with the real and imaginary numbers of Fourier power and the feature vector $y_2$ associated with the power to unit vectors in advance. This makes it possible to normalize the sizes of two different kinds of feature amounts and stabilize the distribution features of feature vectors.

In addition, since the sizes of these vectors have already been normalized within a feature space necessary for discrimination in the process of dimension reduction, normalization robust against noise can be realized as compared with a case wherein normalization is performed in a feature space containing more deleted noise. This normalization can remove the influences of variation elements such as variation components which are proportional to the overall illumination intensity which is difficult to remove by simple linear transformation.

The feature vectors $y_1^0$ and $y_2^0$ normalized in this manner are combined into one feature vector y in the same manner as (equation 8), and the combined feature vector y is projected to a discriminant space by using the discriminant matrix $W_3$ obtained by performing linear discriminant analysis, thereby obtaining an output feature vector z. The discriminant matrix $W_3$ for this purpose is stored in the discriminant matrix storage means 89, and the linear transformation means 88 performs projection computation for this purpose to calculate, for example, a 24-dimensional feature vector z.

When the output feature vector z is to be quantized in five bits per element, the size of each element must be normalized in advance. For example, the size of each element is normalized in advance in accordance with the variance value of each element.

That is, a standard deviation value $\sigma_i$ in a learning sample of each element $z_i$ of the feature vector z is obtained in advance, and normalization is performed to satisfy $z_0 = 16 Z_i / 3\sigma_i$. Assume that the size is five bits. In this case, it suffices if the size is quantized to a value falling within the range of $-16$ to 15.

In this case, normalization is the computation of multiplying each element by the reciprocal of the standard deviation. In consideration of a matrix $\Sigma$ having a $\sigma_i$ as a diagonal element, a normalized vector $z_0$ becomes $z^0 = \Sigma z$. That is, since simple linear transformation is performed, $\Sigma$ may be applied to the discriminant matrix $W_3$ in advance as indicated by equation (15).

$$W_3^{0T} = \Sigma W_3^T \quad (15)$$

Performing normalization in this manner can perform range correction necessary for quantization. In addition, since normalization is performed by using the standard deviation, computation based on the Mahalanobis distance can be performed by only calculating a simple L2 norm in computing the norm of an inter-pattern distance at the time of collation, thereby reducing the computation amount at the time of collation.

As described above, the facial image feature extraction means 722 extracts a feature vector $z_f$ from the normalized image $f(x, y)$ in this manner. With respect to an image $g(x, y)$ obtained by cutting only a central portion of a face, a feature vector $z_g$ is extracted by the facial image feature extraction means 722 in the same manner as described above. The two feature vectors $z_f$ and $z_g$ are extracted by using the facial metadata creating unit as a facial feature amount z.

Note that a computer may be caused to execute the above facial metadata creation sequence by a computer program. In addition, this program may be recorded on a computer-readable recording medium.

(2) Facial Similarity Calculation

The operation of the facial similarity calculation unit 74 will be described next.

The facial similarity calculation unit 74 calculates a similarity $d(z_1, z_2)$ by using K-dimensional feature vectors $z_1$ and $z_2$ obtained from two facial metadata.

For example, a similarity is calculated by the square distance of equation (16).

$$d(z_1, z_2) = \sum_{i=1}^{K} \alpha_i |z_{1,i} - z_{2,i}|^2 \quad (16)$$

where $\alpha_i$ is a weighting factor. If, for example, the reciprocal of the standard deviation of each feature dimension $z_i$ is used, calculation based on the Mahalanobis distance is performed. If feature vectors are normalized in advance by equation (15) or the like, since a basis matrix is normalized in advance with variance values, the Mahalanobis distance is set. Alternatively, a similarity may be calculated by the cosine of each feature vector to be compared which is expressed by equation (3).

$$d(Z_1, Z_2) = \frac{Z_1 \cdot Z_2}{|Z_1||Z_2|} \quad (17)$$

Note that when a distance is used, a larger value indicates a lower similarity (the faces do not resemble each other), whereas when a cosine is used, a larger value indicates a higher similarity (the faces resemble each other).

According to the above description, one facial image is registered, and a retrieval is performed by using one facial image. When, however, a plurality of images are registered for the face of one individual and a retrieval is to be performed by using one facial image, a similarity may be calculated for each of a plurality of facial metadata on the registration side.

Likewise, when a plurality of images are to be registered for the face of one individual and a retrieval is to be performed by using a plurality of images, calculating a similarity by obtaining the mean or minimum value of similarity for each combination makes it possible to calculate a similarity for one facial data. This indicates that the matching system of the present invention can be applied to face verification in an image sequence by regarding the image sequence as a plurality of images.

The embodiments of the present invention have been described above by referring to the accompanying drawings as need. Obviously, however, the present invention can be implemented by a computer-executable program.

In addition, this program may be recorded on a computer-readable recording medium.

Fourth Embodiment

Another embodiment of the present invention will be described in detail with reference to the accompanying drawings. The present invention is directed to an improvement in the facial metadata creating unit 72 according to the third invention. According to the third invention, the discriminant features of the principal components of a feature vector having the real and imaginary parts of a Fourier frequency component obtained by performing a Fourier transform for an input facial image and a feature vector having a power spectrum as an element are calculated, and the discriminant feature of a feature vector obtained by combining the respective vectors is calculated again, thereby calculating the feature amount of the face. In this case, since a Fourier power spectrum reflects the overall feature amount of an input image, components of the input pixels which contain much noise (e.g., pixels around the mouth which tend to change in relative position) are reflected in the power spectrum in the same manner as the remaining pixels. As a consequence, even if an effective feature amount is selected by discriminant analysis, sufficient performance may not be obtained. In such a case, the input image is segmented into regions, and a Fourier transform is performed for each local region. Discriminant analysis is then performed by using a power spectrum for each local region as a feature amount. This can reduce the influences of the feature amount of a region which locally exhibits poor discriminant performance (large within-class variance) by discriminant analysis.

Figure 9:
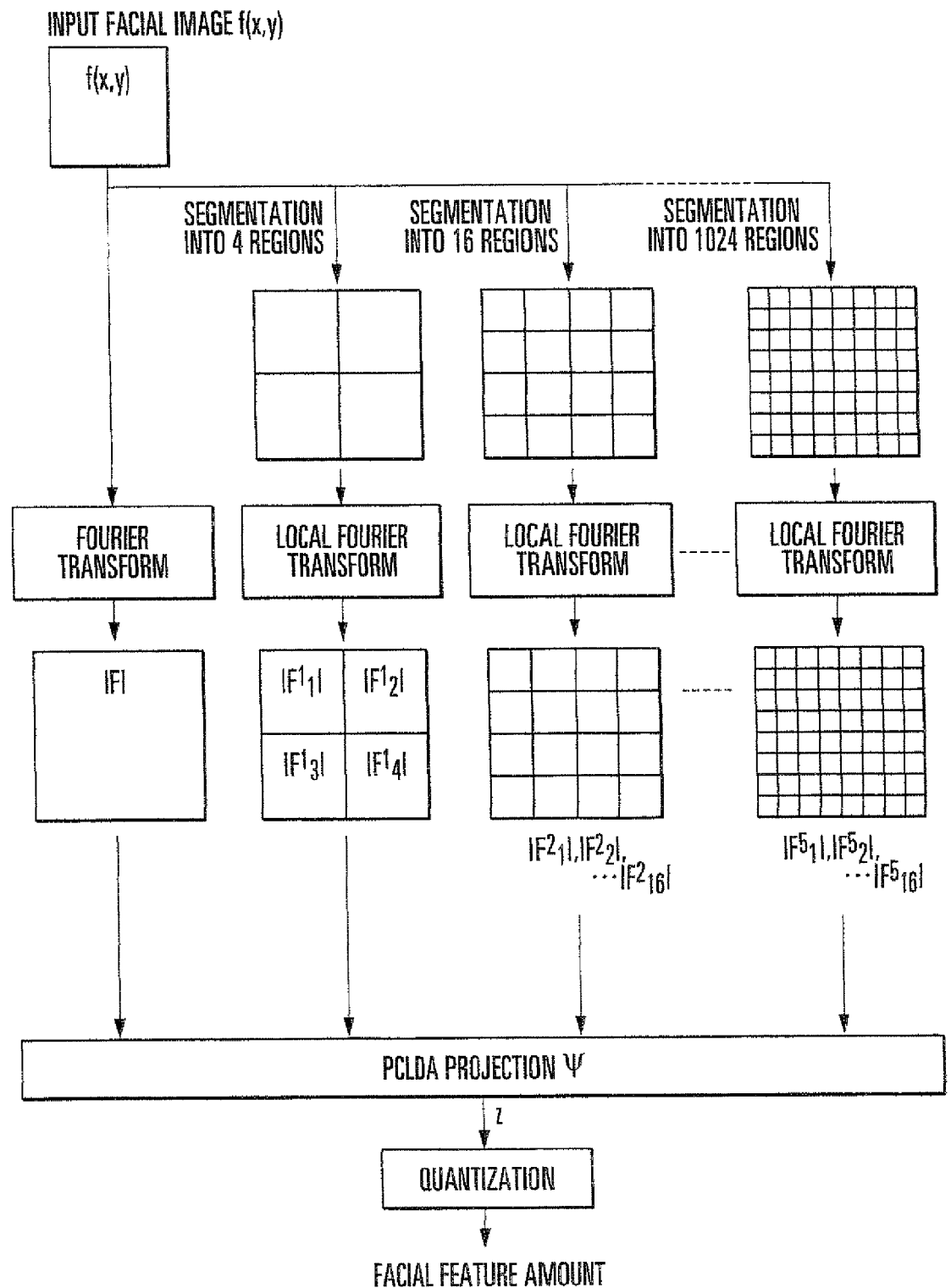
FIG. 9 is a view for explaining an embodiment of the present invention.
Figure 10:
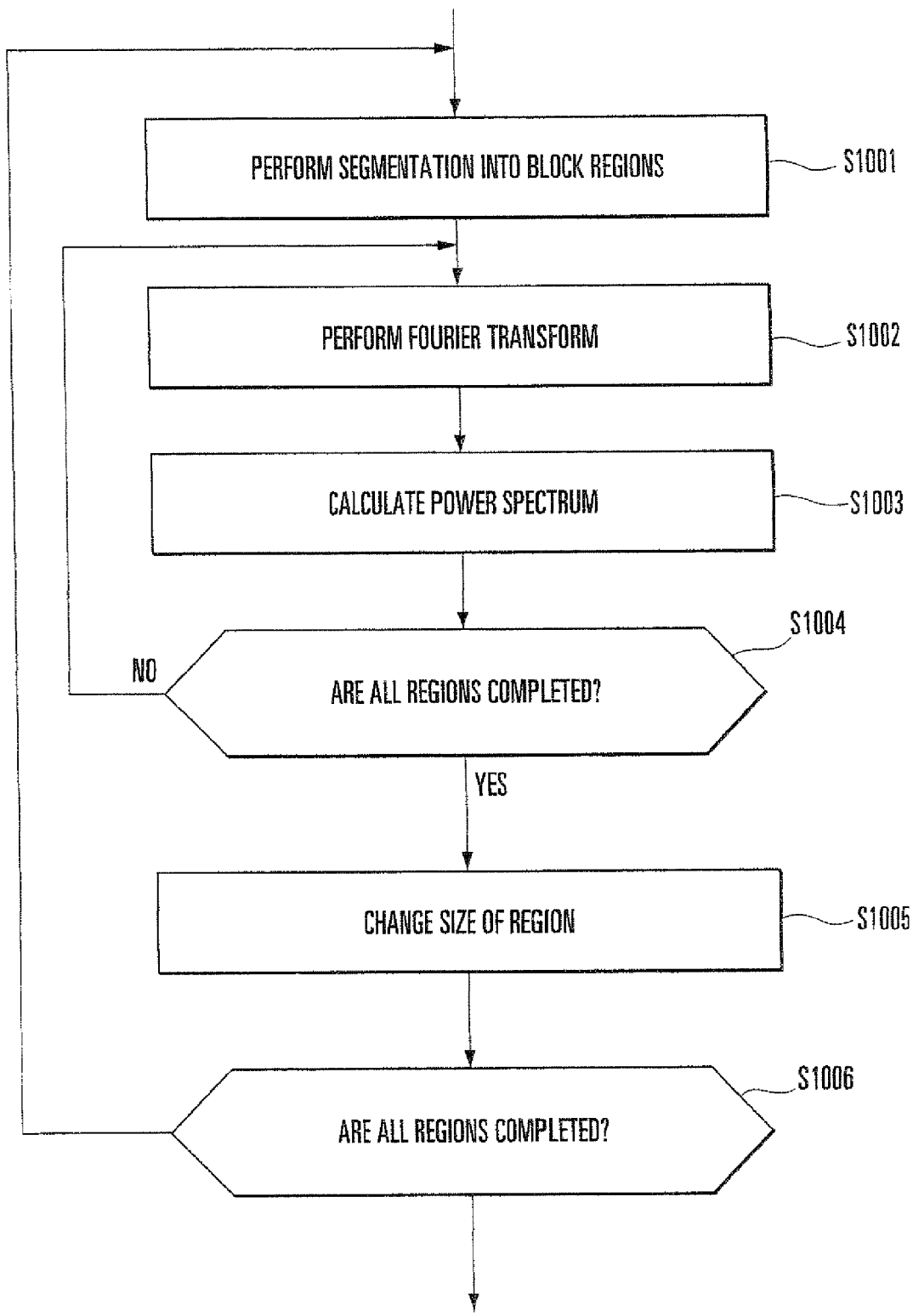
FIG. 10 is a view for explaining an embodiment of the present invention.

FIG. 9 is a view for explaining an embodiment and shows the flow of feature extraction processing. In this embodiment, for example, a 32×32 pixel region is segmented into four 16×16 pixel regions, 16 8×8 pixel regions, 64 4×4 pixel regions, 256 2×2 pixel regions, and 1024 1×1 pixel regions (which are substantially the same as the input image, and hence the input image can be used without segmentation) (S1001). A Fourier transform is performed in each segmented region (S1002). A power spectrum is then calculated (S1003). The above calculation is performed all the segmented regions (S1004). The size of a region is changed (S1005). The sizes of all the regions are changed (S1006). FIG. 10 summarizes this processing flow. 1024×5 dimensions=5120-dimensional feature amount of all the power spectra of the respective regions obtained in this manner is extracted.

Since this number of dimensions is too large in general when learning data is small in amount, the principal component analysis is performed in advance to obtain in advance the basis of the principal component analysis which reduces the number of dimensions. For example, an appropriate number of dimensions is about 300. Discriminant analysis is further performed on the feature vector of this dimension count to obtain a basis which reduces the number of dimensions and corresponds to a feature axis exhibiting good discriminant performance. A basis corresponding to the principal component analysis and discriminant analysis is calculated in advance (this basis will be referred to as a PCLDA projection basis $\psi$).

A discriminant feature z can be obtained by projecting the 5120-dimensional feature by linear computation using the projection basis $\psi$ using this PCLDA basis. The feature amount of the face can be obtained by further performing quantization and the like for this feature.

Note that the 5120-dimensional feature amount can be reduced in the number of dimensions by considering the symmetry of the Fourier power spectrum and removing and not using high-frequency components. This can realize high-speed learning, reduce the amount of data required, and realize high-speed feature extraction. Therefore, the number of dimensions is preferably reduced as needed.

Segmenting a region into blocks and multiplexing Fourier spectra in this manner can sequentially obtain multiple expressions of feature amounts having translation universality and local feature amounts from a feature amount equivalent to an image feature (in the case of 1024 segmentations). A feature amount effective for identification is selected from the multiple, redundant feature expressions by discriminant analysis, thereby obtaining a compact feature amount which provides good identification performance.

A Fourier power spectrum is obtained by nonlinear computation for an image, which can calculate an effective feature amount which cannot be obtained by simply applying discriminant analysis based on linear computation to the image.

Although the application of linear discriminant analysis to principal components has been described above, second-stage feature extraction may be performed by using kernel discriminant analysis (discriminant analysis using a kernel technique called Kernel Fisher Discriminant Analysis, KFDA, Kernel Discriminant Analysis: KDA, or Generalized Discriminant Analysis: GDA).

For a detailed description of kernel discriminant analysis, see the reference by Q. Liu et al. (non-patent reference 3: "Kernel-based Optimized Feature Vectors Selection and Discriminant Analysis for Face Recognition", Processing of IAPR International Conference on Pattern Recognition (ICPR), Vol. II, pp. 362-365, 2002) or the reference by G. Baudat (non-patent reference 4: Generalized Discriminant Analysis Using a Kernel Approach", Neural Computation, Vol. 12, pp. 2385-2404, 2000).

By extracting a feature using kernel discriminant analysis, the effect of nonlinear feature extraction can be enhanced to allow extraction of an effective feature.

Figure 11:
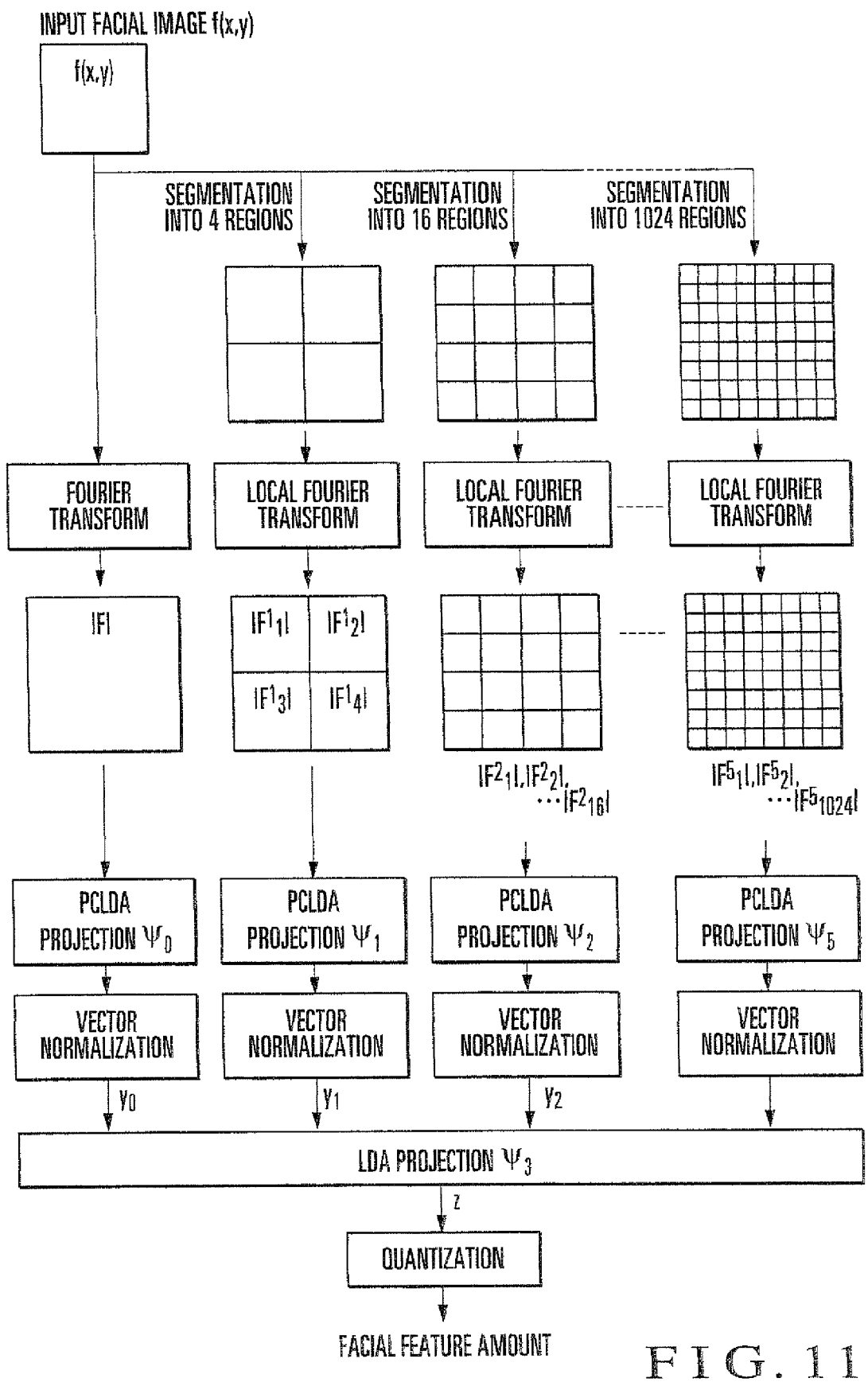
FIG. 11 is a view for explaining an embodiment of the present invention.

In this case, however, since a large feature vector of 5120 dimensions is to be processed, a large amount of memory and a large amount of learning data are required even for the principal component analysis Referring to FIG. 11, in order to avoid such a problem, the principal component analysis/discriminant analysis is individually performed for each block. Thereafter, two-stage discriminant analysis (Linear Discriminant Analysis: LDA) is performed. This makes it possible to reduce the computation amount.

In this case, the principal component analysis and discriminant analysis are performed for each region by using a 1024-dimensional feature amount (512 dimensions if the number of dimensions is reduced to half in consideration of symmetry) to obtain a basis matrix $\psi_i$ (i=0, 1, 2, . . . , 5) in advance. Each feature vector is then normalized by using its mean value, and second-stage LDA projection is performed.

By performing processing for each block in this manner, the number of data and computer resources required for learning can be reduced. This makes it possible to shorten the time required for the optimization of learning.

Note that high-speed computation can be realized by omitting the vector normalization processing and calculating a basis matrix for PCLDA projection and a basis matrix for LDA projection in advance.

Figure 12:
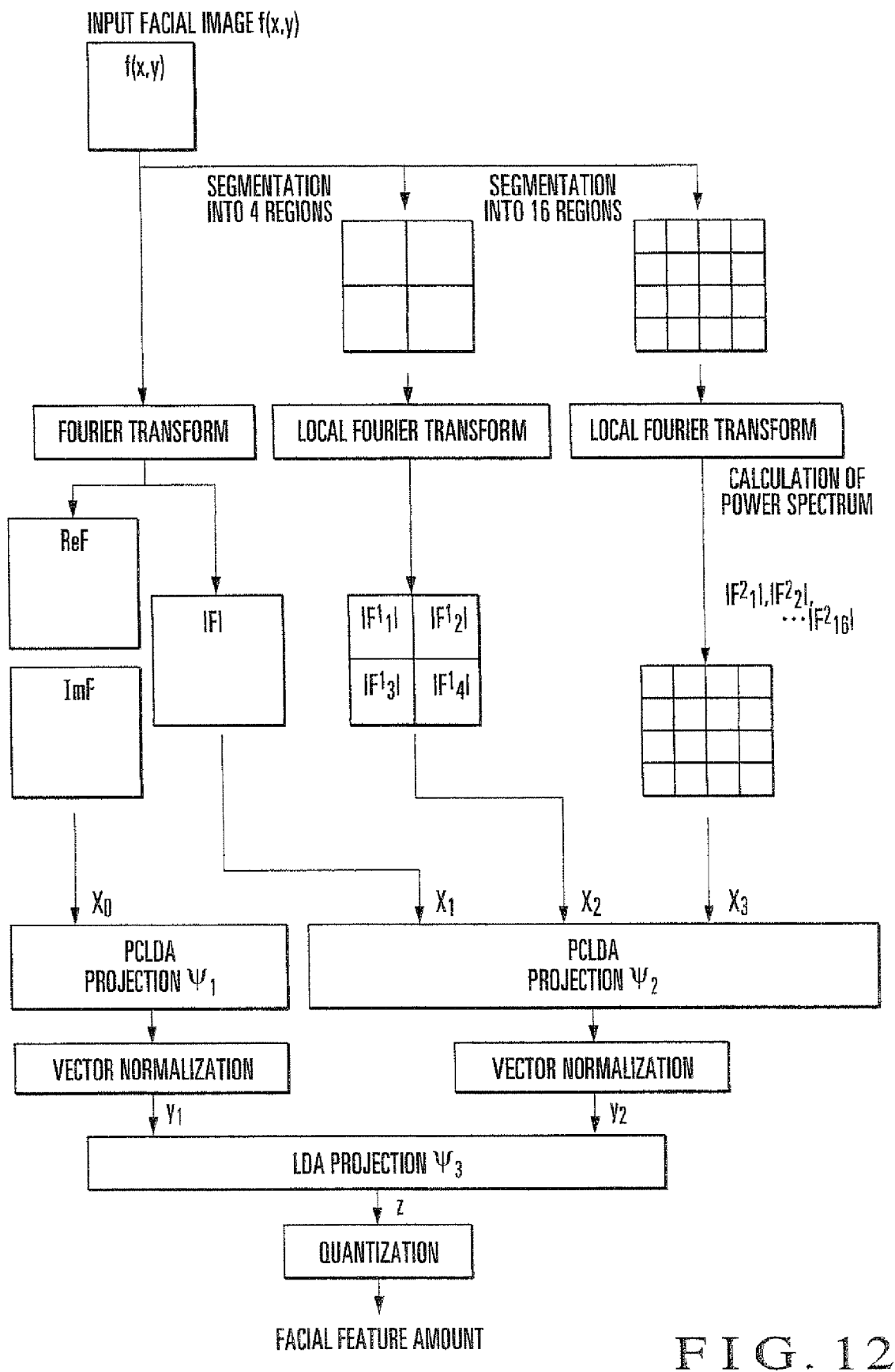
FIG. 12 is a view for explaining an embodiment of the present invention.

FIG. 12 is a view for explaining still another embodiment and shows the flow of feature extraction processing. In this embodiment, such region segmentation is performed in a plurality of stages (two stages in FIG. 12) to extract multiple power spectra in multiple resolutions as feature amounts for discriminant analysis in consideration of the translation universality of Fourier power spectra in local regions and the reliability of the local regions. Feature extraction is then performed using the optimal feature space obtained by discriminant analysis.

Assume that an input image f(x, y) has 32×32 pixels. In this case, as shown in FIG. 10, a power spectrum |F(u, v)| of the entire image, power spectra $|F^1_1(u, v)|, |F^1_2(u, v)|, |F^1_3(u, v)|$, and $|F^1_4(u, v)|$ of four 16×16 pixel regions obtained by segmenting the entire image into four regions, and power spectra $|F^2_1(u, v)|, |F^2_1(u, v)|, \ldots, |F^2_{16}(u, v)|$ of 16 8×8 pixel regions obtained by segmenting the entire image into 16 regions are extracted as feature vectors.

In consideration of the symmetry of the Fourier power spectrum of the real image, it suffices to extract ½ of them. Alternatively, in order to avoid an increase in the size of a feature vector for discriminant analysis, a feature vector may be formed without sampling any high-frequency components for discrimination. If, for example, a feature vector is formed by sampling ¼ of spectra which correspond to low-frequency components, the number of learning samples required can be reduced or the processing time required for learning and recognition can be shortened. If the number of learning data is small, discriminant analysis may be performed after the number of feature dimensions is reduced by the principal component analysis in advance.

Discriminant analysis is performed by using a feature vector $x_2^f$ extracted in this manner and a learning set prepared in advance to obtain a basis matrix $\psi_2^f$ in advance. FIG. 9 shows an example of projection for the extraction of a discriminant feature from principal components (Principal Component Linear Discriminant Analysis; PCLDA). The feature vector $x_2^f$ is projected by using the basis matrix $\psi_2^f$, and the mean and size of the projected feature vector are normalized, thereby calculating a feature vector $y_2^f$.

Likewise, the feature vector $x_2^f$ obtained by combining the real and imaginary components of a Fourier frequency is projected by linear computation processing using a basis matrix $\psi_1^f$ to obtain a feature vector with a reduced number of dimensions, and the mean and size of the vector are normalized to calculate a feature vector $y_1^f$. A feature vector obtained by combining these vectors is projected again by using a discriminant basis $\psi_3^f$ to obtain a feature vector $z^f$. This vector is quantized in, for example, five bits to extract a facial feature amount.

Assume that the input is a facial image normalized to a size of 44×56 pixels. In this case, the above processing is applied to the 32×32 pixels of a central portion to extract a facial feature amount. In addition, facial feature amounts are also extracted from multiple segmented regions of the 44×56 pixel region of the entire face, including the entire 44×56 pixel region, four 22×28 pixel regions, and 16 11×14 pixel pixels.

Figure 13:
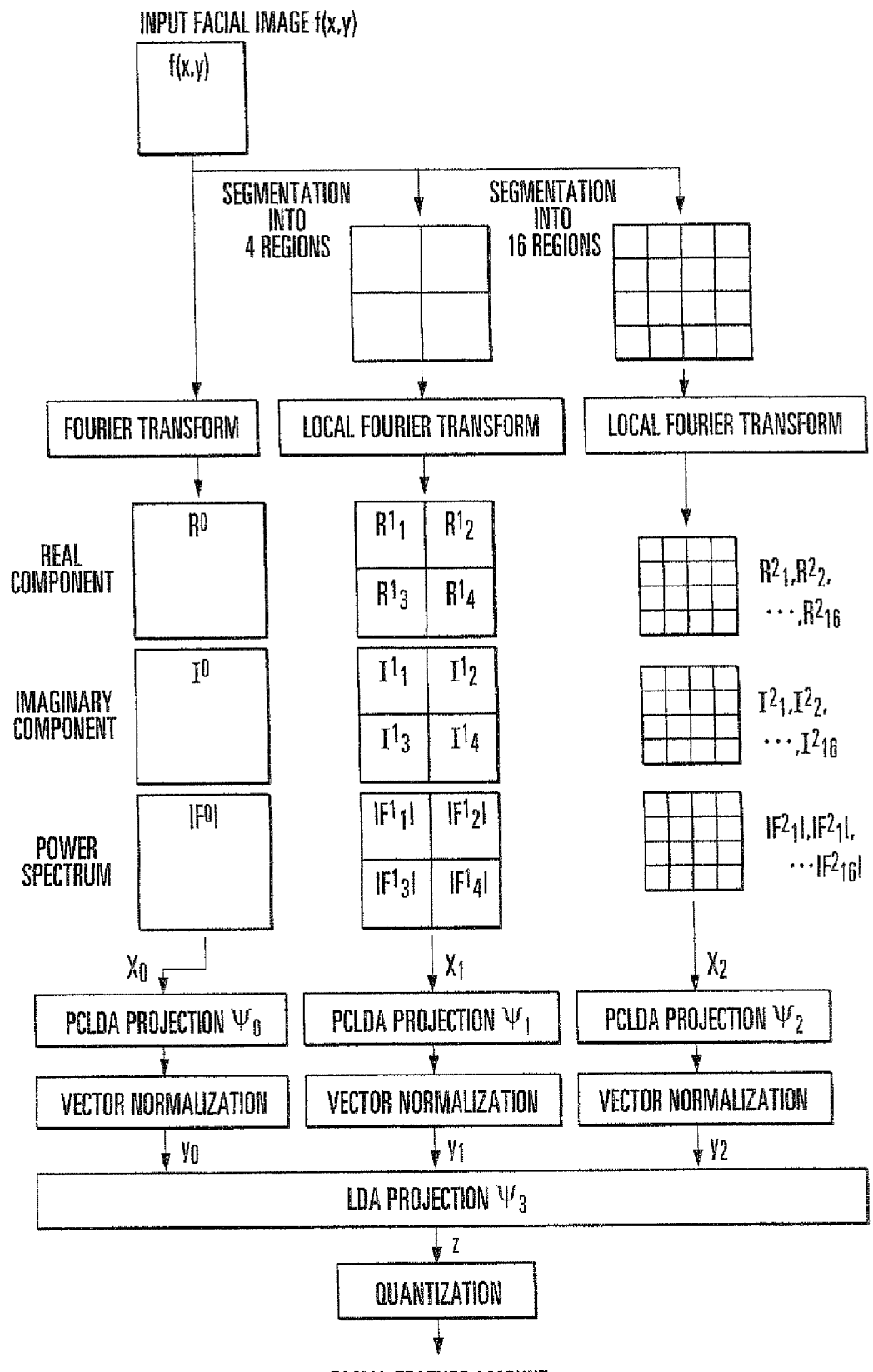
FIG. 13 is a view for explaining an embodiment of the present invention.
Figure 14:
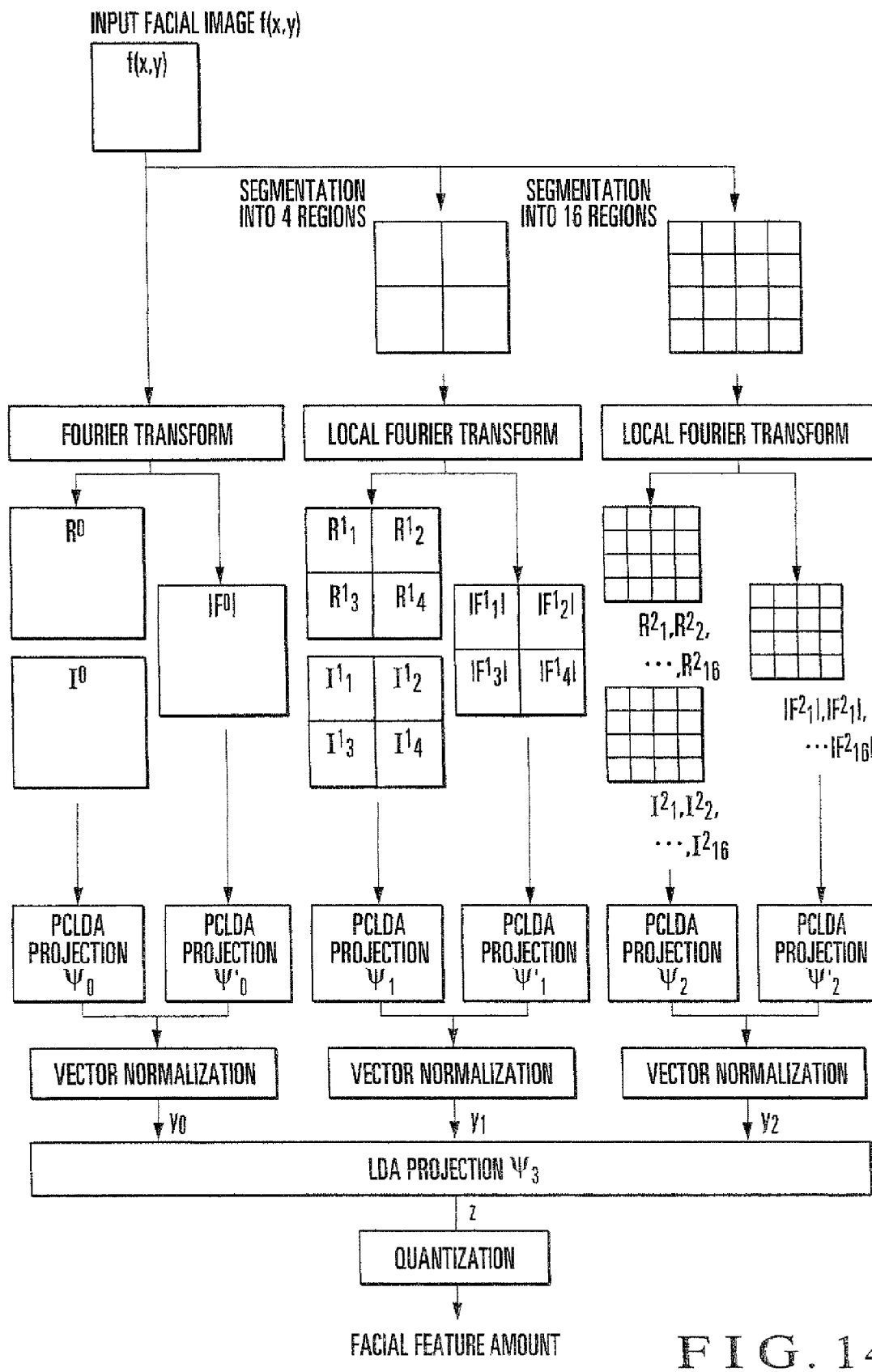
FIG. 14 is a view for explaining an embodiment of the present invention.

FIG. 13 shows another embodiment, in which PCLDA projection of a combination of a real component, an imaginary component, and a power spectrum is performed for each local region, or PCLDA projection of a feature obtained by combining a real component and imaginary component and PCLDA projection of a power spectrum are separately performed, and LDA projection is finally performed, as shown in FIG. 14.

Fifth Embodiment

Another embodiment of the present invention will be described in detail with reference to the accompanying drawings.

This embodiment is an embodiment of a facial feature description method using the present invention and descriptors of facial features. FIG. 15 shows a description of a facial feature amount, as an example of a facial feature description, which uses a DDL representation syntax (Description Definition Language Representation Syntax) in ISO/IEC FDIS 15938-3, "Information technology Multimedia content description interface—Part 3: Visual".

In this case, for a description of a facial feature named "AdvancedFaceRecognition", elements named "FourierFeature" and "CentralFourieFeature" are provided. Each of "FourierFeature" and "CentralFourieFeature" is a 5-bit integer without a sign, representing that it can have 24-dimensional components to 63-dimensional components.

FIG. 16 shows a rule in a case wherein a binary representation syntax is used for data representation. According to this rule, the sizes of the array components of FourierFeature and CentralFourierFeature are stored in the field of 6-bit integers without signs in numOfFourierFeature and numOfCentralFourier, and each component of FourierFeature and CentralFourierFeature is stored in the form of a 5-bit integer without a sign.

Descriptors of such facial features using the present invention will be described in more detail.

numofFourierFeature

This field specifies the number of components of FourierFeature. The allowable range is from 24 to 63.

numOfCentralFourierFeature

This field specifies the number of components of CentralFourierFeature. The allowable range is from 24 to 63.

FourierFeature

This element represents a facial feature based on the cascaded LDA of the Fourier characteristics of a normalized face image. The normalized face image is obtained by scaling an original image into 56 lines with 46 luminance values in each line. The center positions of two eyes in the normalized face image shall be located on the 24th row and the 16th and 31st columns for the right and left eyes respectively.

Figure 17:
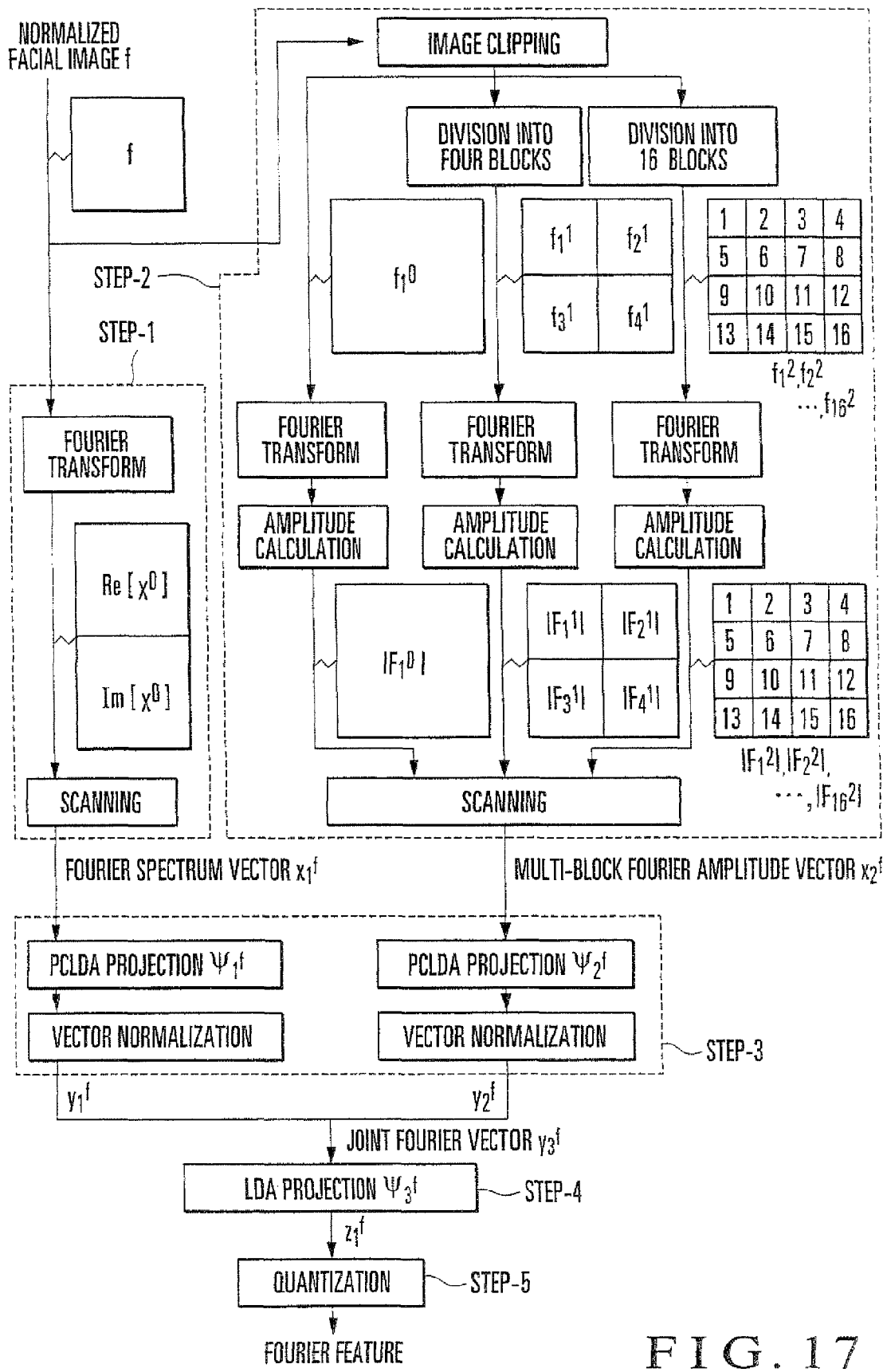
FIG. 17 is a view for explaining how to extract a Fourier feature (FourierFeature) in the fifth embodiment of the present invention.

The FourierFeature element is derived from two feature vectors; one is a Fourier Spectrum Vector $x_1^f$, and the other is a Multi-block Fourier Amplitude Vector $x_2^f$. FIG. 17 illustrates the extraction process of FourierFeature. Given a normalized face image, five steps should be performed to extract the element;

(1) Extraction of a Fourier Spectrum Vector $x_1^f$,
(2) Extraction of a Multi-block Fourier Amplitude Vector $x_2^f$, (3) Projections of feature vectors using PCLDA basis matrices $\psi_1^f$, $\psi_2^f$, and their normalization to unit vectors $y_1^f$, $y_2^f$,
(4) Projection of a Joint Fourier Vector $y_3^f$ of the unit vectors using an LDA basis matrix $\psi_3^f$,
(5) Quantization of the projected vector $Z^f$.

Step-1) Extraction of Fourier Spectrum Vector

Figure 18:
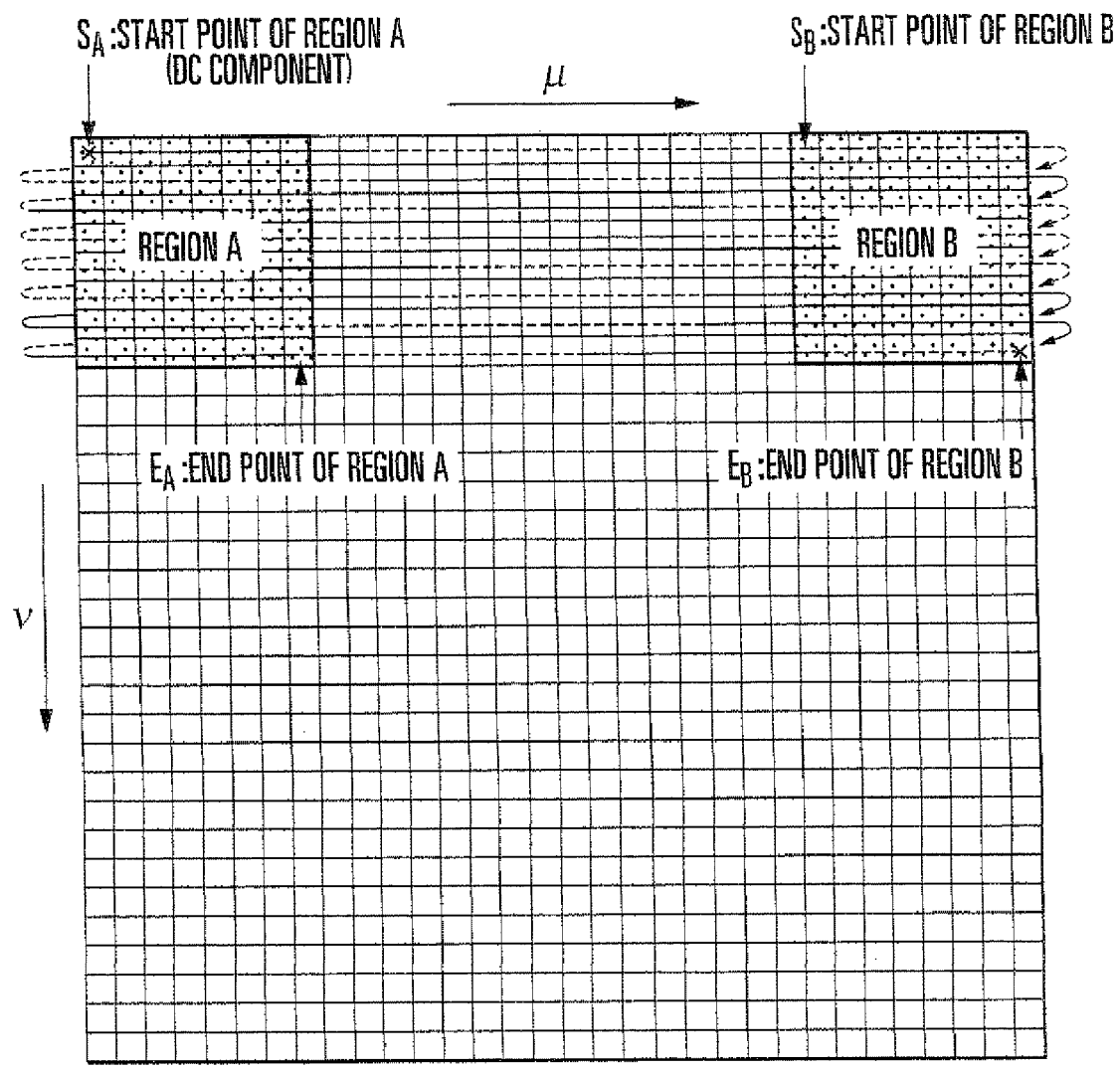
FIG. 18 is a view showing an example of a Fourier spectrum scanning method in the fifth embodiment of the present invention.

Given a normalized face image f(x, y), the Fourier spectrum F(u, v) of f(x, y) is calculated by $$F(u, v) = \sum_{x=0}^{M-1}\sum_{y=0}^{N-1} f(x, y)\exp\left(2\pi i\left(\frac{xu}{M} + \frac{yv}{N}\right)\right) \quad (18)$$
$$(u = 0, \ldots, M-1; v = 0, \ldots, N-1)$$

where, M=46 and N=56. A Fourier Spectrum Vector $x_1^f$ is defined as a set of scanned components of the Fourier spectrum. FIG. 18 shows the scanning method of the Fourier spectrum. The scanning shall be performed only on two rectangle regions, regions A and region B, in the Fourier domain. The scanning rule is concluded in FIG. 19. Here, $S_R(u, v)$ denotes the top-left coordinate of region R, and $E_R(u, v)$ does the bottom-right point of region R. Therefore, the Fourier Spectrum Vector $x_1^f$ is expressed by $$x_1^f = \begin{pmatrix} Re[F(0, 0)] \\ \vdots \\ Re[F(11, 0)] \\ Re[F(35, 0)] \\ \vdots \\ Re[F(45, 0)] \\ \vdots \\ Re[F(45, 13)] \\ Im[F(0, 0)] \\ \vdots \\ Im[F(11, 0)] \\ Im[F(35, 0)] \\ \vdots \\ Im[F(45, 0)] \\ \vdots \\ Im[F(45, 13)] \end{pmatrix} \quad (19)$$

The dimension of $x_1^f$ is 644.

Step 2) Extraction of Multi-Block Fourier Amplitude Vector

A multi-block Fourier Amplitude Vector is extracted from the Fourier amplitudes of partial images in the normalized face image. As the partial images, three types of images are used; (a) a holistic image, (b) quarter images, and (a) 1/16 images.

(a) Holistic Image

A holistic image $f_1^0(x, y)$ is obtained by clipping the normalized image f(x, y) in 44×56 image size removing boundary columns in both sides. It is given by $$f_1^0(x,y) = f(x+1,y) \quad (x=0, 1, \ldots, 43; y=0, 1, \ldots, 55) \quad (20)$$

(b) Quarter Images

Quarter images are obtained by dividing the holistic image $f_1^0(x, y)$ equally into 4 blocks $f_k^1(x, y)$ (k=1, 2, 3, 4) given by $$f_k^1(x,y) = f_1^0(x+22s_k^1, y+28t_k^1) \quad (x=0, 1, \ldots, 21; y=0, 1, \ldots, 27) \quad (21)$$

where $s_k^1 = (k-1)\%2$, $t_k^1 = (k-1)/2$.

(c) One-Sixteenth Images

One-sixteenth images are obtained by dividing $f_1^0(x, y)$ equally into 16 equal blocks $f_k^2(x, y)$ (k=1, 2, 3, ..., 16) given by $$f_k^2(x,y) = f_1^0(x+11s_k^2, y+14t_k^2) \quad (x=0, 1, \ldots, 10; y=0, 1, \ldots, 13) \quad (22)$$

where $s_k^2 = (k-1)\%4$, $t_k^2 = (k-1)/4$.

From these images, Fourier amplitudes $|F_k^j(u, v)|$ are calculated follows:

$$F_k^j(u, v) = \sum_{x=0}^{M^j-1}\sum_{y=0}^{N^j-1} f_k^j(x, y)\exp\left(-2\pi i\left(\frac{xu}{M^j} + \frac{yv}{N^j}\right)\right), \quad (23)$$
$$|F_k^j(u, v)| = \sqrt{Re[F_k^j(u, v)]^2 + Im[F_k^j(u, v)]^2}$$

where $M^j$ is the width of each partial image, that is, $M^0=44$, $M^1=22$, and $M^2=11$. $N^j$ denotes the height of each partial image, that is, $N^0=56$, $N^1=28$, and $N^2=14$.

Multi-block Fourier Amplitude Vectors is obtained by scanning low frequency regions of each amplitude $|F_k^j(u, v)|$ of 1) the holistic image (k=1), 2) the quarter images (k=1, 2, 3, 4), and 3) the one-sixteenth images (k=1, 2, ..., 16). The scan regions are defined in FIG. 19.

Therefore, the Multi-block Fourier Amplitude Vector $x_2^f$ is expressed as follows:

$$x_x^f = \begin{pmatrix} |F_1^0(0, 0)| \\ \vdots \\ |F_1^0(43, 13)| \\ |F_1^1(0, 0)| \\ \vdots \\ |F_1^1(21, 6)| \\ |F_2^1(0, 0)| \\ \vdots \\ |F_2^1(21, 6)| \\ |F_3^1(0, 0)| \\ \vdots \\ |F_4^1(21, 6)| \\ |F_1^2(0, 0)| \\ \vdots \\ |F_{16}^2(10, 2)| \end{pmatrix} \quad (24)$$

The dimension of $x_2^f$ is 856.

Step 3) PCLDA Projection and Vector Normalization

The Fourier Spectrum Vector $x_1^f$ and Multi-block Fourier Amplitude Vector $x_2^f$ shall be respectively projected using the PCLDA basis matrices $\psi_1^f$ and $\psi_2^f$, and normalized to unit vectors $y_1^f$ and $y_2^f$. The normalized vector $y_k^f$ (k=1, 2) is given by $$y_k^f = \frac{\Psi_k^{fT} x_k^f - m_k^f}{|\Psi_k^{fT} x_k^f - m_k^f|} \quad (25)$$

where, the PCLDA basis matrix $\psi_k^f$ and the mean vector $m_k^f$ are a basis matrix obtained by performing linear discriminant analysis on the principal components of $x_k^f$ and a mean of projected vectors, respectively. The values of them are given by referring to a look-up-table calculated in advance. The dimensions of $y_1^f$ and $y_2^f$ are 70 and 80, respectively.

Step 4) LDA Projection of Joint Fourier Vector

The normalized vectors $y_1^f$ and $y_2^f$ are combined to form a 150-dimensional Joint Fourier vector $y_3^f$, and projected using the LDA basis matrix $\psi_3^f$. The projected vector $z^f$ is given by $$z^f = \Psi_3^{f^T} y_3^f \qquad (26)$$
$$= \Psi_3^{f^T} \begin{pmatrix} y_1^f \\ y_2^f \end{pmatrix}$$

Step 5) Quantization

Each elements of $z^f$ is clipped in the range of 5 bit-unsigned integer using the following equation:

$$w_i^f = \begin{cases} 0 & \text{if } z_i^f < -16 \\ 31, & \text{if } z_i^f > -15 \\ \text{floor}(z_i^f + 16) & \text{others} \end{cases} \qquad (27)$$

The quantized elements are stored as FourierFeature. FourierFeature[0] represents the first quantized element $w_o^f$, and FourierFeature[numOfFourierFeature−1] corresponds to the (numOfFourierFeature)th element $w_{numOfFourierFeature-1}^f$.

CentralFourierFeature

This element represents a facial feature based on the cascaded LDA of the Fourier characteristics of the central part in the normalized face image. CentralFourierFeature is extracted in the similar way as FourierFeature.

The central portion g(x, y) is obtained by clipping the image f(x, y) into 32×32 image starting at (7, 12) as follows:

$$g(x,y)=f(x+7,y+12) \ (x=0, 1, \ldots, 31; y=0, 1, \ldots, 31) \qquad (28)$$

Step 1) Extraction of Central Fourier Spectrum Vector

The Fourier spectrum G(u, v) of g(x, y) is calculated by $$G(u, v) = \sum_{x=0}^{M-1} \sum_{y=0}^{N-1} g(x, y) \exp\left(-2\pi i\left(\frac{xu}{M} + \frac{yv}{N}\right)\right) \qquad (29)$$

$$(u = 0, \ldots, M-1; v = 0, \ldots, N-1)$$

where, M=32 and N=32. A 256-dimensional Central Fourier Spectrum Vector $x_1^g$ is produced by scanning the Fourier spectrum G(u, v) as defined in FIG. 20.

Step 2) Extraction of Multi-Block Central Fourier Amplitude Vector

A Central Multi-block Fourier Amplitude Vectors $x_2^g$ is extracted from the Fourier amplitudes of (a) the central part $g_1^0(x,y)$, (b) quarter images $g_k^1(x,y)$ (k=1, 2, 3, 4), and (c) 1/16 images $g_k^2(x,y)$ (k=1, 2, 3, . . . , 16).

(a) Central Part $$g_1^0(x,y)=g(x,y) \ (x=0, 1, \ldots, 31; y=0, 1, \ldots, 31) \qquad (30)$$

(b) Quarter Images $$g_k^1(x,y)=g(x+16s_k^1,y+16t_k^1) \ (x=0, 1, \ldots, 15; y=0, 1, \ldots, 15) \qquad (31)$$

where $s_k^1=(k-1)\%2$, $t_k^1=(k-1)/2$ (c) One-Sixteenth Images $$g_k^2(x,y)=g_1^0(x+8s_k^2,y+8t_k^2) \ (x=0, 1, \ldots, 7; y=0, 1, \ldots, 7) \qquad (32)$$

where $s_k^2=(k-1)\%4$ and $t_k^2=(k-1)/4$.

A Fourier amplitude $|G_k^j(u, v)|$ of each image is calculated as follows:

$$G_k^j(u, v) = \sum_{x=0}^{M^j-1} \sum_{y=0}^{N^j-1} g_k^j(x, y) \exp\left(-2\pi i\left(\frac{xu}{M^j} + \frac{yv}{N^j}\right)\right), \qquad (33)$$

$$|G_k^j(u, v)| = \sqrt{\text{Re}[G_k^j(u, v)]^2 + \text{Im}[G_k^j(u, v)]^2}$$

where $M^0=32$, $M^1=16$, $M^2=8$, $N^0=32$, $N^1=16$, and $N^2=8$. A multi-block Central Fourier Amplitude Vector $x_2^g$ is obtained by scanning each amplitude $|G_k^j(u, v)|$ as defined in FIG. 20.

The processing in STEP 3-5) are the same as those FourierFeature, for example, the Joint Central Fourier Vector $y_3^g$ consists of the normalized vectors $y_1^g$ and $y_2^g$. The basis matrices $\psi_1^g$, $\psi_2^g$, and $\psi_3^g$ and the mean vectors $m_1^g$ and $m_2^g$ for CentralFourierFeature are calculated in advance, and prepared in the form of a look-up table.

The size of CentralFourierFeature is indicated by numOfCentralFourierFeature.

Facial feature description data obtained in this manner is compact in description length but exhibits high recognition performance, and hence is an expression efficient for the storage and transmission of data.

Note that the present invention may be implemented by a computer-executable program. In the case of the fifth embodiment, the present invention can be implemented by describing the functions indicated by steps 1 to 5 in FIG. 17 in a computer-readable program and making the program function on the computer.

In addition, this program may be recorded on a computer-readable recording medium.

Figure 21:
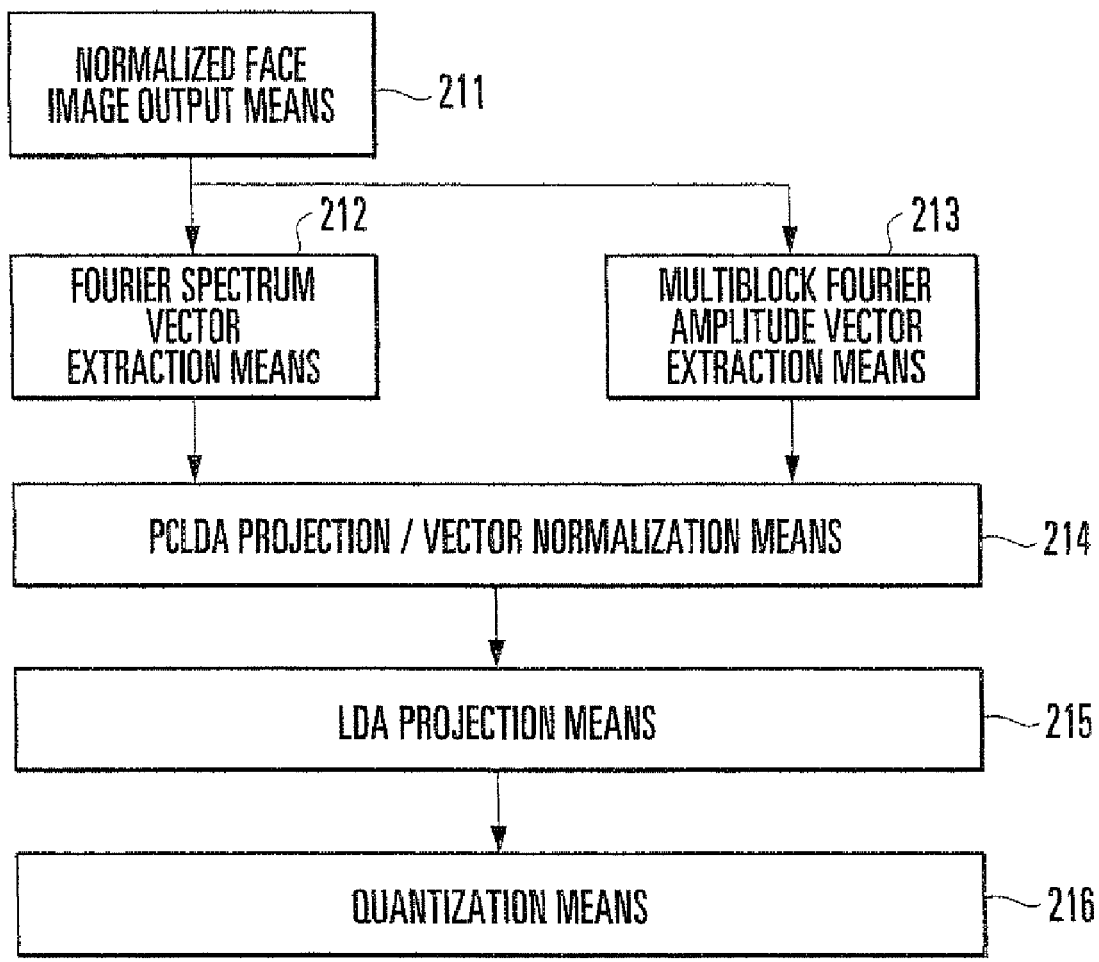
FIG. 21 is a view showing an example of a block diagram in the fifth embodiment of the present invention.

When the example shown in FIG. 17 is to be implemented as a device, all or some of the functions written in the block diagram of FIG. 21 may be implemented. More specifically, all or some of a normalized face image output means 211, Fourier spectrum vector extraction means 212, multiblock Fourier amplitude vector extraction means 213 and PCLDA projection/vector normalization means 214 may be implemented.

According to each embodiment described above, a feature vector effective for discrimination by discriminant analysis is extracted from an input pattern feature vector for each element vector, and feature extraction is performed again for the obtained feature vector by using a discriminant matrix by discriminant analysis. This makes it possible to suppress a reduction in feature amount effective for discrimination when feature dimension reduction is performed, and to transform a feature vector for efficient feature extraction.

Each embodiment described above is effective for a case wherein the number of learning samples required for discriminant analysis is limited in spite of a large pattern feature amount. That is, the number of feature dimensions can be reduced, while a loss of features effective for identification is suppressed, without necessarily using the principal component analysis.

As has been described above, the image feature extraction method, the image feature extraction device, and the recording medium storing the corresponding program in the field of pattern recognition according to the present invention are suitable for the use in a feature vector transformation technique for compressing feature dimension by extracting feature vectors effective for recognition from input feature vectors.

The invention claimed is:

1. A pattern feature extraction method comprising:

dividing via a processor an input image into sets of a plurality of equally partitioned block images, wherein each dividing step divides said input image into said sets of said plurality of equally partitioned block images by a divisor, the divisor for each set differing from one set to another;

extracting via a processor a Fourier amplitude of each of the input image and the block images that are obtained in each dividing step for generating a multiblock Fourier amplitude vector composed of the thus extracted Fourier amplitudes of the input image and the block images to thereby extracting a feature amount of the input image;

projecting the multiblock Fourier amplitude vector using a basis matrix to obtain a projection vector; and normalizing the projection vector to obtain a normalized vector, wherein the basis matrix is a basis matrix specified by a transformation matrix for extracting principal components of the multiblock Fourier amplitude vector and by a discriminant matrix obtained by discriminant analysis on the principal components.

* * * * *